US011516283B2

(12) United States Patent
Raghu

(10) Patent No.: US 11,516,283 B2
(45) Date of Patent: Nov. 29, 2022

(54) MULTI-TENANT-CLOUD-AGGREGATION AND APPLICATION-SUPPORT SYSTEM

(71) Applicant: VMware, Inc., Palo Alto, CA (US)

(72) Inventor: Jagannath N. Raghu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/162,817

(22) Filed: Jan. 29, 2021

(65) Prior Publication Data

US 2021/0297476 A1 Sep. 23, 2021

Related U.S. Application Data

(63) Continuation of application No. 16/377,629, filed on Apr. 8, 2019, now Pat. No. 10,911,524, which is a continuation of application No. 15/161,695, filed on May 23, 2016, now Pat. No. 10,257,261, which is a continuation of application No. 13/540,170, filed on Jul. 2, 2012, now Pat. No. 9,348,652.

(51) Int. Cl.
| | |
|---|---|
| *H04L 29/08* | (2006.01) |
| *H04L 67/10* | (2022.01) |
| *G06F 9/50* | (2006.01) |
| *G06F 9/455* | (2018.01) |
| *H04L 41/22* | (2022.01) |
| *H04L 41/50* | (2022.01) |

(52) U.S. Cl.
CPC .......... *H04L 67/10* (2013.01); *G06F 9/45558* (2013.01); *G06F 9/5072* (2013.01); *H04L 41/22* (2013.01); *G06F 2009/45595* (2013.01); *H04L 41/508* (2013.01)

(58) Field of Classification Search
CPC ..... H04L 67/10; H04L 41/22; G06F 9/45558; G06F 9/5072
USPC ........................................................ 709/217
See application file for complete search history.

(56) References Cited

U.S. PATENT DOCUMENTS

| | | | |
|---|---|---|---|
| 6,266,809 B1 | 7/2001 | Craig et al. | |
| 6,609,128 B1 | 8/2003 | Underwood | |
| 6,976,093 B2 | 12/2005 | Lara et al. | |
| 7,024,668 B2 | 4/2006 | Shiomi et al. | |

(Continued)

FOREIGN PATENT DOCUMENTS

| | | |
|---|---|---|
| EP | 2299360 A1 | 3/2011 |
| EP | 2381363 A2 | 10/2011 |
| JP | 2007507046 A | 3/2007 |

OTHER PUBLICATIONS

Konstantinou et al., "An Architecture for Virtual Solution Composition and Deployment in Infrastructure Clouds", Jun. 2009, ACM, pp. 9-17.

(Continued)

*Primary Examiner* — Glenford J Madamba

(57) ABSTRACT

The present application is directed to a distributed system that provides multi-cloud aggregation and that includes a cloud-connector server, cloud-connector nodes, and one or more service-provider nodes that cooperate to provide services that are distributed across multiple clouds. A service-provider node obtains tenant-associated information from a virtual data center in which the service-provider node is installed and provides the tenant-associated information to the cloud-connector server.

20 Claims, 24 Drawing Sheets

(56) References Cited

U.S. PATENT DOCUMENTS

| | | |
|---|---|---|
| 7,243,306 B1 | 7/2007 | Joshi et al. |
| 7,275,244 B1 | 9/2007 | Bell et al. |
| 7,356,679 B1 | 4/2008 | Le et al. |
| 7,370,322 B1 | 5/2008 | Matena et al. |
| 7,533,381 B2 | 5/2009 | Ando |
| 7,577,722 B1 | 8/2009 | Khandekar et al. |
| 7,634,488 B2 | 12/2009 | Keys et al. |
| 7,874,008 B2 | 1/2011 | Chang et al. |
| 7,971,059 B2 | 6/2011 | Calman et al. |
| 8,074,218 B2 | 12/2011 | Eilam et al. |
| 8,091,084 B1 | 1/2012 | Dobrovolskiy et al. |
| 8,108,912 B2 | 1/2012 | Ferris |
| 8,176,094 B2 | 5/2012 | Friedman |
| 8,176,559 B2 | 5/2012 | Mathur et al. |
| 8,201,237 B1* | 6/2012 | Doane ............... H04L 67/34 726/15 |
| 8,225,093 B2 | 7/2012 | Fok et al. |
| 8,327,357 B2 | 12/2012 | Amsden |
| 8,359,594 B1 | 1/2013 | Davidson et al. |
| 8,375,360 B2 | 2/2013 | l'Anson |
| 8,407,689 B2 | 3/2013 | Dournov et al. |
| 8,429,630 B2 | 4/2013 | Nickolov et al. |
| 8,578,375 B2 | 11/2013 | Pagan et al. |
| 8,584,119 B2 | 11/2013 | Ellington et al. |
| 8,601,226 B1 | 12/2013 | Lappas et al. |
| 8,627,310 B2 | 1/2014 | Ashok et al. |
| 8,682,957 B2 | 3/2014 | Elson et al. |
| 2002/0174421 A1 | 11/2002 | Zhao et al. |
| 2002/0178254 A1 | 11/2002 | Brittenham et al. |
| 2003/0061247 A1 | 3/2003 | Renaud |
| 2004/0030710 A1 | 2/2004 | Shadle |
| 2004/0183831 A1 | 9/2004 | Ritchy et al. |
| 2005/0022198 A1 | 1/2005 | Olapurath et al. |
| 2005/0198303 A1 | 9/2005 | Knauerhase et al. |
| 2005/0257206 A1 | 11/2005 | Semerdzhiev |
| 2005/0278518 A1 | 12/2005 | Ko et al. |
| 2005/0289536 A1 | 12/2005 | Nayak et al. |
| 2006/0010176 A1 | 1/2006 | Armington |
| 2006/0037071 A1 | 2/2006 | Rao et al. |
| 2006/0079356 A1 | 4/2006 | Kodama et al. |
| 2006/0080412 A1 | 4/2006 | Oprea et al. |
| 2006/0136701 A1 | 6/2006 | Dickinson |
| 2006/0136897 A1 | 6/2006 | Laxminarayan et al. |
| 2006/0248522 A1 | 11/2006 | Lakshminarayanan et al. |
| 2007/0058548 A1 | 3/2007 | Babonneau et al. |
| 2007/0204262 A1 | 8/2007 | Ahluwalia et al. |
| 2007/0209035 A1 | 9/2007 | Sonderegger et al. |
| 2008/0046299 A1 | 2/2008 | Simons et al. |
| 2008/0109788 A1 | 5/2008 | Prieto |
| 2008/0163171 A1 | 7/2008 | Chess et al. |
| 2008/0209016 A1 | 8/2008 | Karve et al. |
| 2008/0244577 A1 | 10/2008 | Le et al. |
| 2008/0307414 A1 | 12/2008 | Alpern et al. |
| 2009/0070752 A1 | 3/2009 | Alpern et al. |
| 2009/0070853 A1 | 3/2009 | Chung et al. |
| 2009/0100420 A1 | 4/2009 | Sapuntzakis et al. |
| 2009/0112919 A1 | 4/2009 | De Spiegeleer |
| 2009/0172781 A1 | 7/2009 | Masuoka et al. |
| 2009/0187995 A1 | 7/2009 | Lopatic |
| 2009/0216970 A1 | 8/2009 | Basler et al. |
| 2009/0276771 A1 | 11/2009 | Nickolov et al. |
| 2009/0320012 A1 | 12/2009 | Lee et al. |
| 2009/0320019 A1 | 12/2009 | Ellington et al. |
| 2010/0103837 A1 | 4/2010 | Jungck et al. |
| 2010/0131590 A1 | 5/2010 | Coleman et al. |
| 2010/0142447 A1 | 6/2010 | Schlicht et al. |
| 2010/0146424 A1 | 6/2010 | Chihara et al. |
| 2010/0146425 A1 | 6/2010 | Lance et al. |
| 2010/0251328 A1 | 9/2010 | Syed et al. |
| 2010/0257605 A1 | 10/2010 | McLaughlin et al. |
| 2010/0281166 A1 | 11/2010 | Buyya et al. |
| 2010/0318649 A1 | 12/2010 | Moore et al. |
| 2010/0325624 A1 | 12/2010 | Bartolo et al. |
| 2010/0333085 A1 | 12/2010 | Criddle et al. |
| 2011/0004916 A1 | 1/2011 | Schiffman et al. |
| 2011/0029947 A1 | 2/2011 | Markovic |
| 2011/0055707 A1 | 3/2011 | Kimmet |
| 2011/0055714 A1 | 3/2011 | Vemulapalli et al. |
| 2011/0055828 A1 | 3/2011 | Amsden |
| 2011/0061046 A1 | 3/2011 | Phillips |
| 2011/0267137 A1 | 3/2011 | Ko et al. |
| 2011/0107411 A1 | 5/2011 | McClain et al. |
| 2011/0126197 A1 | 5/2011 | Larsen et al. |
| 2011/0145790 A1 | 6/2011 | Rajaraman et al. |
| 2011/0145836 A1 | 6/2011 | Wheeler et al. |
| 2011/0153684 A1 | 6/2011 | Yung |
| 2011/0153727 A1 | 6/2011 | Li |
| 2011/0153824 A1 | 6/2011 | Chikando et al. |
| 2011/0167469 A1 | 7/2011 | Letca et al. |
| 2011/0208804 A1 | 8/2011 | Kuzhiyil et al. |
| 2011/0214124 A1 | 9/2011 | Ferris et al. |
| 2011/0231552 A1 | 9/2011 | Carter et al. |
| 2011/0258333 A1 | 10/2011 | Pomerantz et al. |
| 2011/0258619 A1 | 10/2011 | Wookey |
| 2011/0271280 A1 | 11/2011 | Cao et al. |
| 2011/0276713 A1* | 11/2011 | Brand ............... G06F 16/178 709/232 |
| 2011/0296052 A1 | 12/2011 | Guo et al. |
| 2011/0302569 A1 | 12/2011 | Kunze et al. |
| 2012/0047185 A1 | 2/2012 | Driesen et al. |
| 2012/0072480 A1 | 3/2012 | Hays et al. |
| 2012/0084769 A1 | 4/2012 | Adi et al. |
| 2012/0102481 A1 | 4/2012 | Mani et al. |
| 2012/0151273 A1* | 6/2012 | Ben Or ............... G06F 11/2205 714/41 |
| 2012/0159469 A1 | 6/2012 | Laor |
| 2012/0185913 A1 | 7/2012 | Martinez et al. |
| 2012/0240135 A1 | 9/2012 | Risbood et al. |
| 2012/0254850 A1 | 10/2012 | Hido et al. |
| 2012/0266159 A1 | 10/2012 | Risbood et al. |
| 2012/0317039 A1 | 12/2012 | Kaplinger et al. |
| 2012/0324116 A1 | 12/2012 | Dorai et al. |
| 2013/0006689 A1 | 1/2013 | Kinnear et al. |
| 2013/0041931 A1* | 2/2013 | Brand ............... G06F 16/13 709/203 |
| 2013/0185715 A1 | 7/2013 | Dunning et al. |
| 2013/0218731 A1* | 8/2013 | Elson ............... G06Q 30/04 705/30 |
| 2013/0227091 A1 | 8/2013 | Tompkins |
| 2013/0232480 A1 | 9/2013 | Winterfeldt et al. |
| 2014/0082167 A1* | 3/2014 | Robinson ............ G06F 11/1458 709/223 |

OTHER PUBLICATIONS

International Search Report, dated Jun. 28, 2012, in PCT Application No. PCT/US2012/033356, filed Apr. 12, 2012, with Written Opinion.

Sun et al., "Simplifying service Deployment with Virtual Applicances", 2008 IEEE International Conference on Services Computing, Jul. 7, 2008, pp. 265-272.

Fen Liu, et al. Saas Integration fro Software Cloud; 2010 IEEE; pp. 402-409 <http://ieeexplore.ieee.org/stamp/stamp.isp?tp=&arnumber=5557968>.

Dave Thomas; Enabling Application Agility—Software as a Service, Cloud Computing and Dynamic Languages; 2008 Jot; pp. 29-32; <http:jot.fm/issues/issue_2008_05/column3.pdf>.

Partial European Search Report dated Jul. 1, 2011, Application No. 11163533.0, filing date Apr. 21, 2011 (Apr. 21, 2011), 6 pages.

Goodwill. James: "Java Web Applications", O'Reilly, Mar. 15, 2001 (Mar. 15, 2001), pp. 1-3, XP002646828, Retrieved from the Internet: URL: http://onjava.com/lpt/a/671 [retrieved on Jun. 30, 2011].

Goodwill, James: "Deploying Web applications to Tomcat", O'Reilly, Apr. 19, 2001 (Apr. 19, 2001), pp. 1-11, XP002646829, Retrieved from the Internet: URL: http://oreilly.com/lpt/a/780 [retrieved on Jun. 30, 2011].

Laurent Tonon: "Tomcat Architecture Diagram", Apr. 26, 2011 (Apr. 26, 2011), p. 1, XP002646830, Retrieved from the Internet: URL: http://marakana.com/forums/tomcat/general/1 06.html [retrieved on Jul. 1, 2011].

(56) References Cited

OTHER PUBLICATIONS

Leitner, P., "Application-Level Performance Monitoring of Cloud Services Based on the Complex Event Processing Paradigm," Distributed Systems Group, Vienna University of Technology, Dec. 2012, vol. 9, pp. 1-8.
White page of BMC software, "Virtualization management with BMC and VMware" © 2011 BMC software, 2 pages.
Wei et al., "Managing security of virtual machine images in a cloud environment", Nov. 13, 2009, 6 pages.
Hansen et al., "Scalable Virtual machine storage using local disks", Dec. 2010, 9 pages.
Michade L Armbrust et al., A View of cloud Computing, 2010 ACM, pp. 50-58; <http://dl.acm.org/citation.cfm?id=>.
H. Andres Lagar-Cavilla et al.; SnowFiock Rapid Virtual Machine Cloning for Cloud Computing; 2009 ACM; pp. 1-12; <http: dl.acm.org/citation .cfm?id= 1519067>.
Matthias Schmidt et al., Efficient distribution of virtual machines for cloud computing; 2010 IEEE; pp. 567-574; <http://ieeexplore.ieee.org/stamp/stamp.jsp?tp=arnumber=5452476>dlacm.org/citation.
Jacob Gorm Hansen et al., Lithium Machine Storage for the Cloud; 2010 ACM; pp. 15-26; <http://dlacm.org/citation.cfm?id= 1807134>.
Konstantinou, Alexander V., "An Architecture for Virtual Solution Composition and Deployment in Infrastructure 0 Clouds," VTDC'09, Jun. 15, 2009, Barcelona, Spain, pp. 917.

\* cited by examiner

MULTI-TENANT-CLOUD-AGGREGATION AND APPLICATION-SUPPORT SYSTEM

RELATED APPLICATIONS

The present patent application is a continuation of U.S. application Ser. No. 16/377,629 filed Apr. 8, 2019, entitled "Multi-Tenant-Cloud-Aggregation and Application-Support System", which is a continuation of U.S. application Ser. No. 15/161,695, filed May 23, 2016, entitled "Multi-Tenant-Cloud-Aggregation and Application-Support System", now U.S. Pat. No. 10,257,261 issued on Apr. 9, 2019, which is a continuation of U.S. application Ser. No. 13/540,170, filed Jul. 2, 2012, entitled "Multi-Tenant-Cloud-Aggregation and Application-Support System", now U.S. Pat. No. 9,348,652 issued on May 24, 2016, the entirety of each is incorporated herein by reference.

TECHNICAL FIELD

The present patent application is directed to virtual-machine-based computing and cloud computing and, in particular, to multiple-cloud-computing-facility aggregations interconnected by a cloud-connector-server and multiple cloud-connector nodes.

BACKGROUND

The development and evolution of modern computing has, in many ways, been facilitated by the power of logical abstraction. Early computers were manually programmed by slow and tedious input of machine instructions into the computers' memories. Over time, assembly-language programs and assemblers were developed in order to provide a level of abstraction, namely assembly-language programs, above the machine-instruction hardware-interface level, to allow programmers to more rapidly and accurately develop programs. Assembly-language-based operations are more easily encoded by human programmers than machine-instruction-based operations, and assemblers provided additional features, including assembly directives, routine calls, and a logical framework for program development. The development of operating systems provided yet another type of abstraction that provided programmers with logical, easy-to-understand system-call interfaces to computer-hardware functionality. As operating systems developed, additional internal levels of abstraction were created within operating systems, including virtual memory, implemented by operating-system paging of memory pages between electronic memory and mass-storage devices, which provided easy-to-use, linear memory-address spaces much larger than could be provided by the hardware memory of computer systems. Additional levels of abstractions were created in the programming-language domain, with compilers developed for a wide variety of compiled languages that greatly advanced the ease of programming and the number and capabilities of programming tools with respect those provided by assemblers and assembly languages. Higher-level scripting languages and special-purpose interpreted languages provided even higher levels of abstraction and greater ease of application development in particular areas. Similarly, block-based and sector-based interfaces to mass-storage devices have been abstracted through many levels of abstraction to modern database management systems, which provide for high-available and fault-tolerant storage of structured data that can be analyzed, interpreted, and manipulated through powerful high-level query languages.

In many ways, a modern computer system can be thought of as many different levels of abstractions along many different, often interdependent, dimensions. More recently, powerful new levels of abstraction have been developed with respect to virtual machines, which provide virtual execution environments for application programs and operating systems. Virtual-machine technology essentially abstracts the hardware resources and interfaces of a computer system on behalf of multiple virtual machines, each comprising one or more application programs and an operating system. Even more recently, the emergence of cloud computing services can provide abstract interfaces to enormous collections of geographically dispersed data centers, allowing computational service providers to develop and deploy complex Internet-based services that execute on tens or hundreds of physical servers through abstract cloud-computing interfaces.

While levels of abstraction within computational facilities are generally intended to be well organized and are often hierarchically structured, with dependencies and interconnections generally constrained to adjacent levels in the various hierarchies, practically, there are often many inter-dependencies that span multiple hierarchical levels and that pose difficult design and implementation issues. As levels of abstraction continue to be added to produce new and useful computational interfaces, such as cloud-computing-services interfaces, designers, developers, and users of computational tools continue to seek implementation methods and strategies to efficiently and logically support additional levels of abstraction.

SUMMARY

The present application is directed to a distributed system that provides multi-cloud aggregation and that includes a cloud-connector server, cloud-connector nodes, and one or more service-provider nodes that cooperate to provide services that are distributed across multiple clouds. A service-provider node obtains tenant-associated information from a virtual data center in which the service-provider node is installed and provides the tenant-associated information to the cloud-connector server.

DETAILED DESCRIPTION

Figure 1:
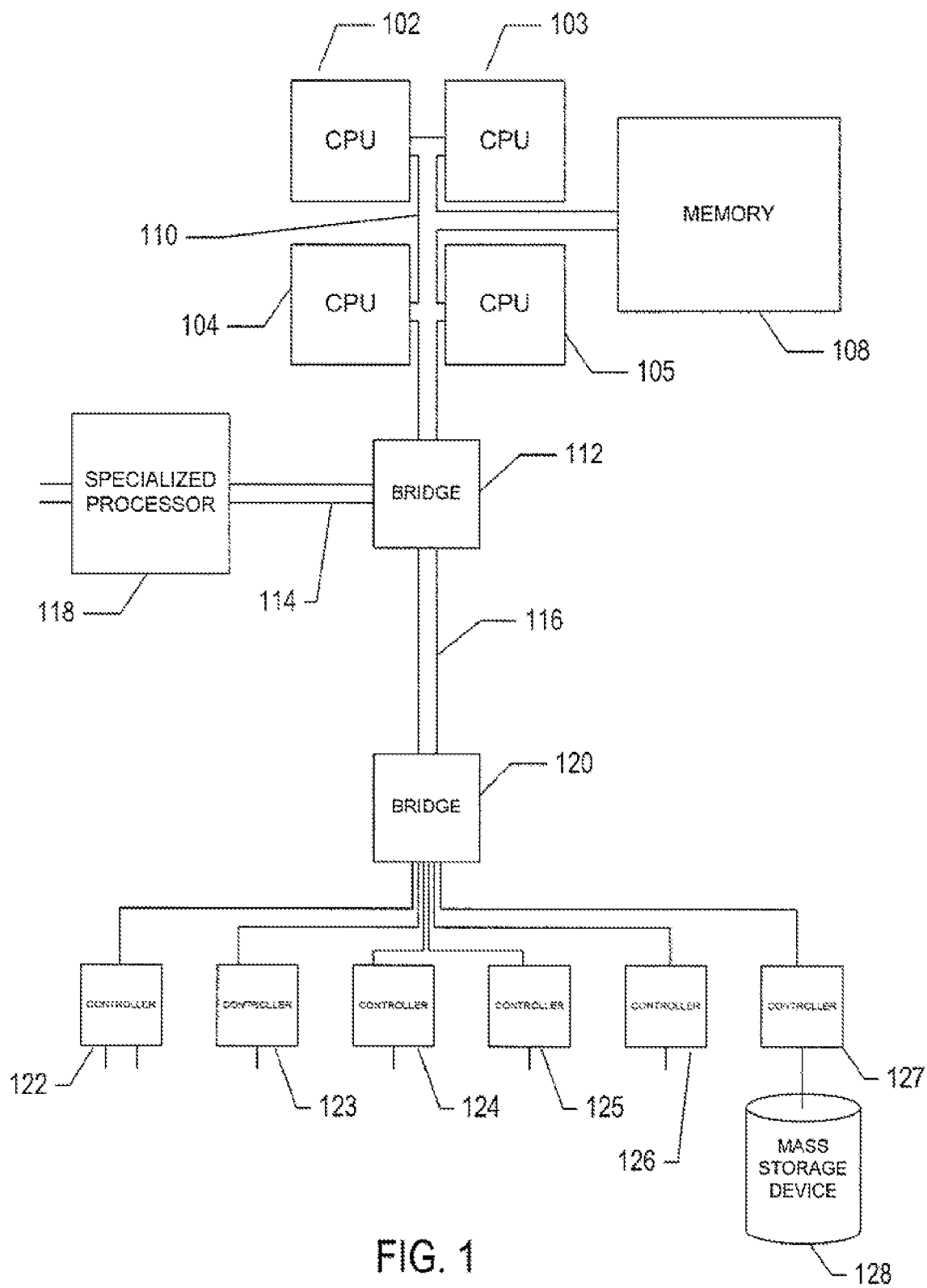
FIG. 1 provides a general architectural diagram for various types of computers.

As discussed above, modern computing can be considered to be a collection of many different levels of abstraction above the computing-hardware level that includes physical computer systems, data-storage systems and devices, and communications networks. The present application is related to a multi-cloud-aggregation level of abstraction that provides homogenous-cloud and heterogeneous-cloud distributed management services, each cloud generally an abstraction of a large number of virtual resource pools comprising processing, storage, and network resources, each of which, in turn, can be considered to be a collection of abstractions above underlying physical hardware devices.

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction" when used to describe certain aspects of modern computing. For example, one frequently encounters allegations that because a computational system is described in terms of abstractions, functional layers, and interfaces, that it is somehow different from a physical machine or device. Such allegations are unfounded. One only needs to disconnect a computer system or group of computer systems from their respective power supplies to appreciate the physical, machine nature of complex computer technologies. One also frequently encounters statements made by those unfamiliar with modern technology and science that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential control component of processor-controlled machines and devices, no less essential than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
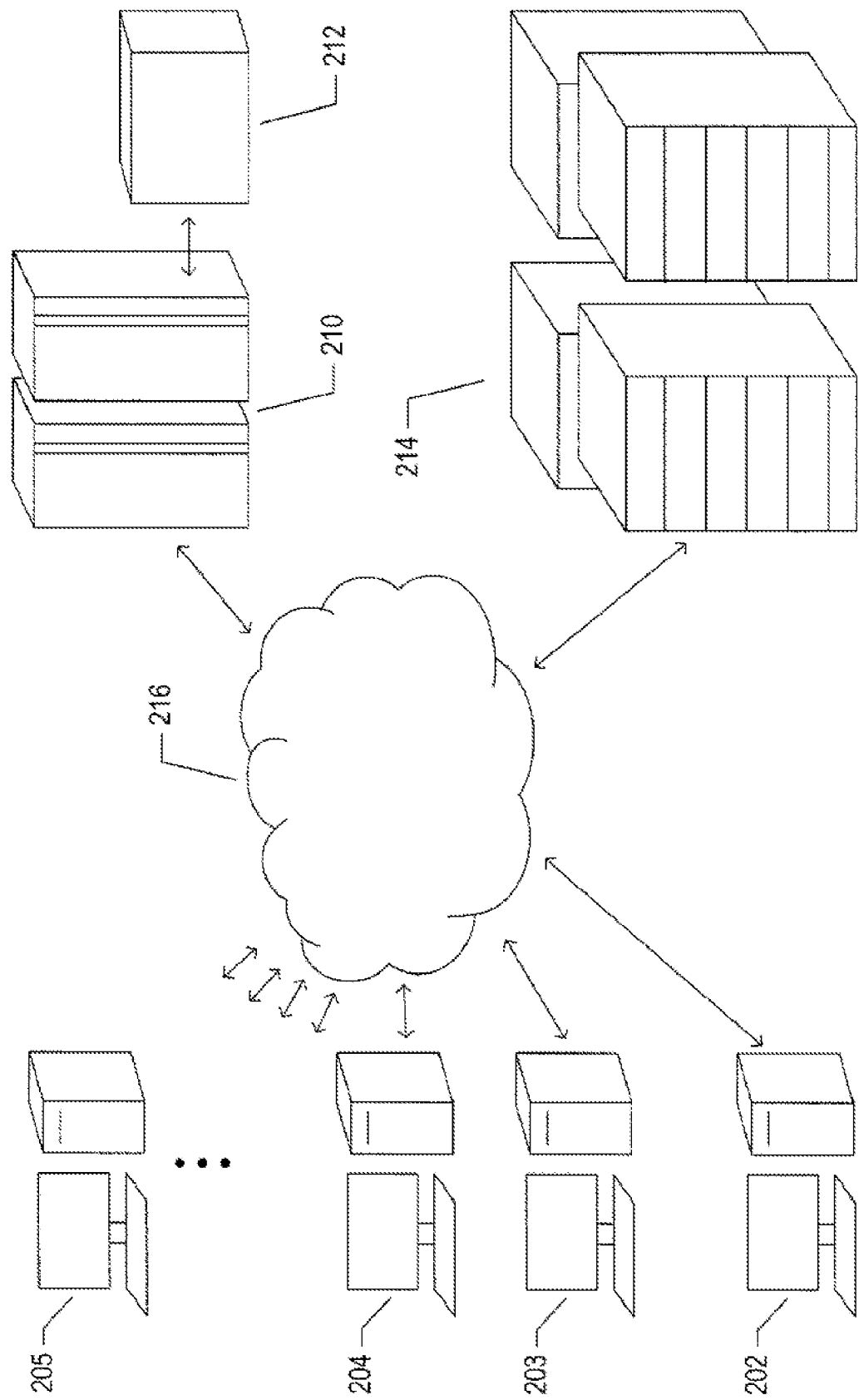
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
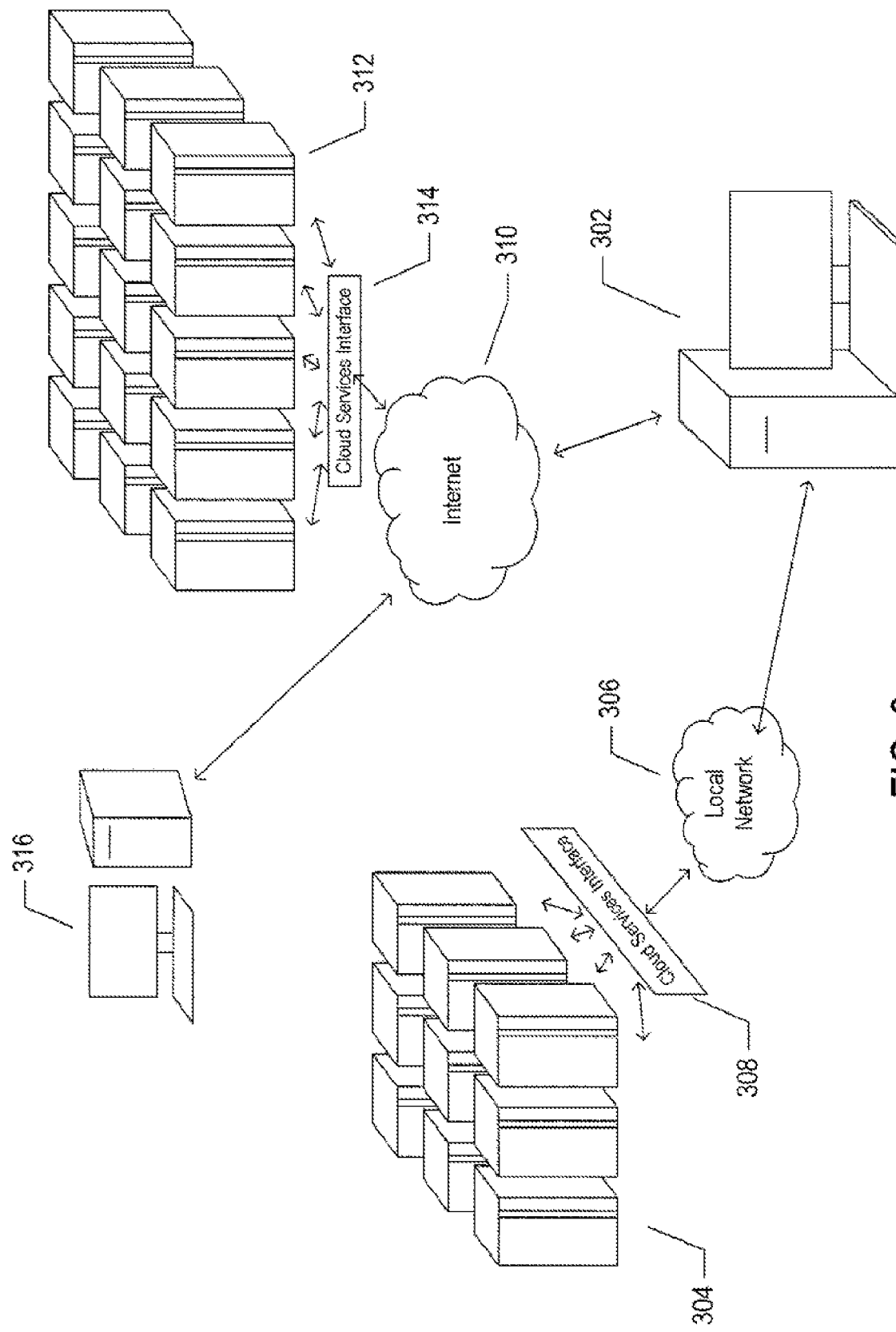
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
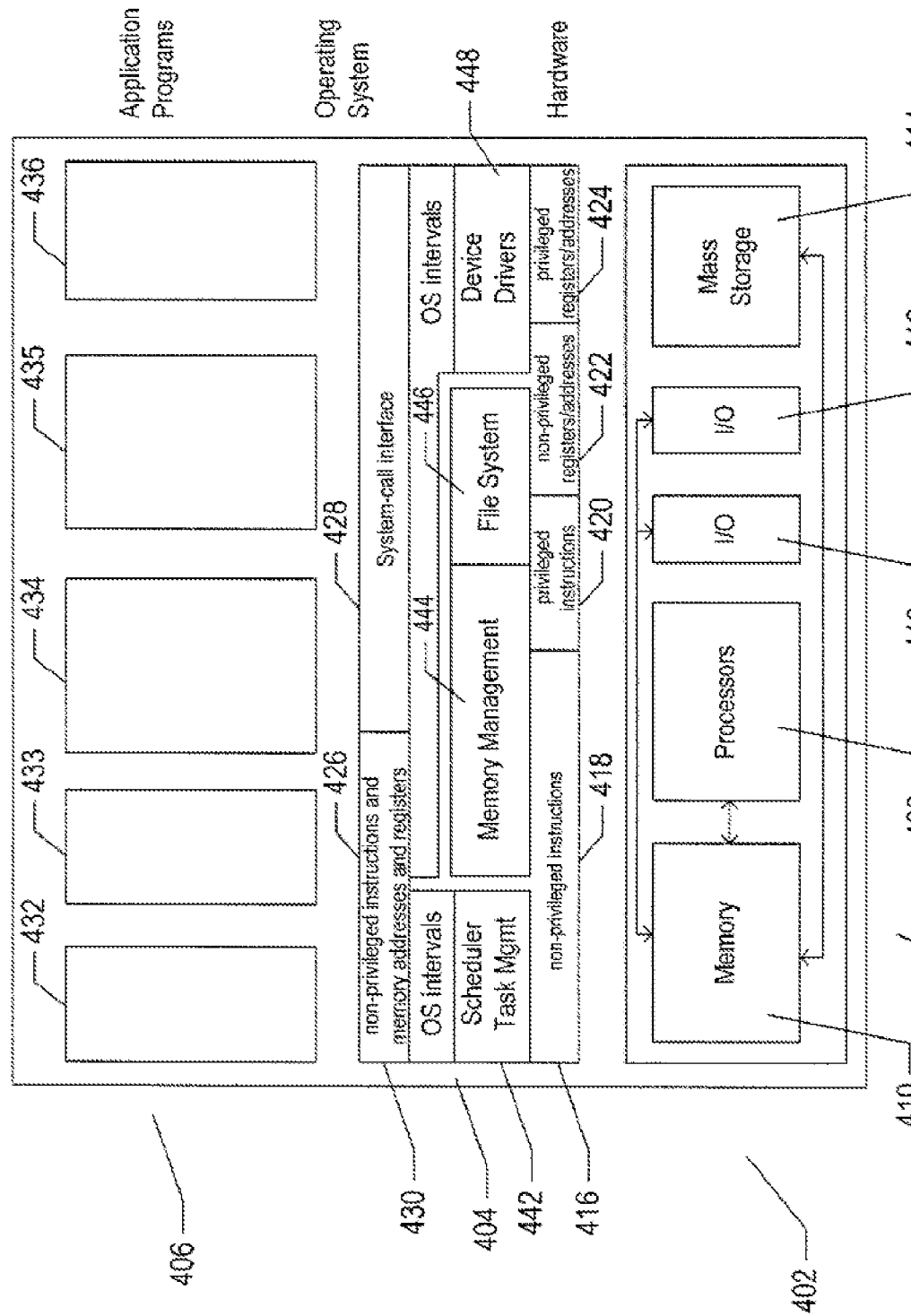
FIG. 4 illustrates generalized hardware and software components of a general-purpose compute system, such as a general-purpose computer system having an architecture similar to that shown in FIG. 1.

FIG. 4 illustrates generalized hardware and software components of a general-purpose compute system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5:
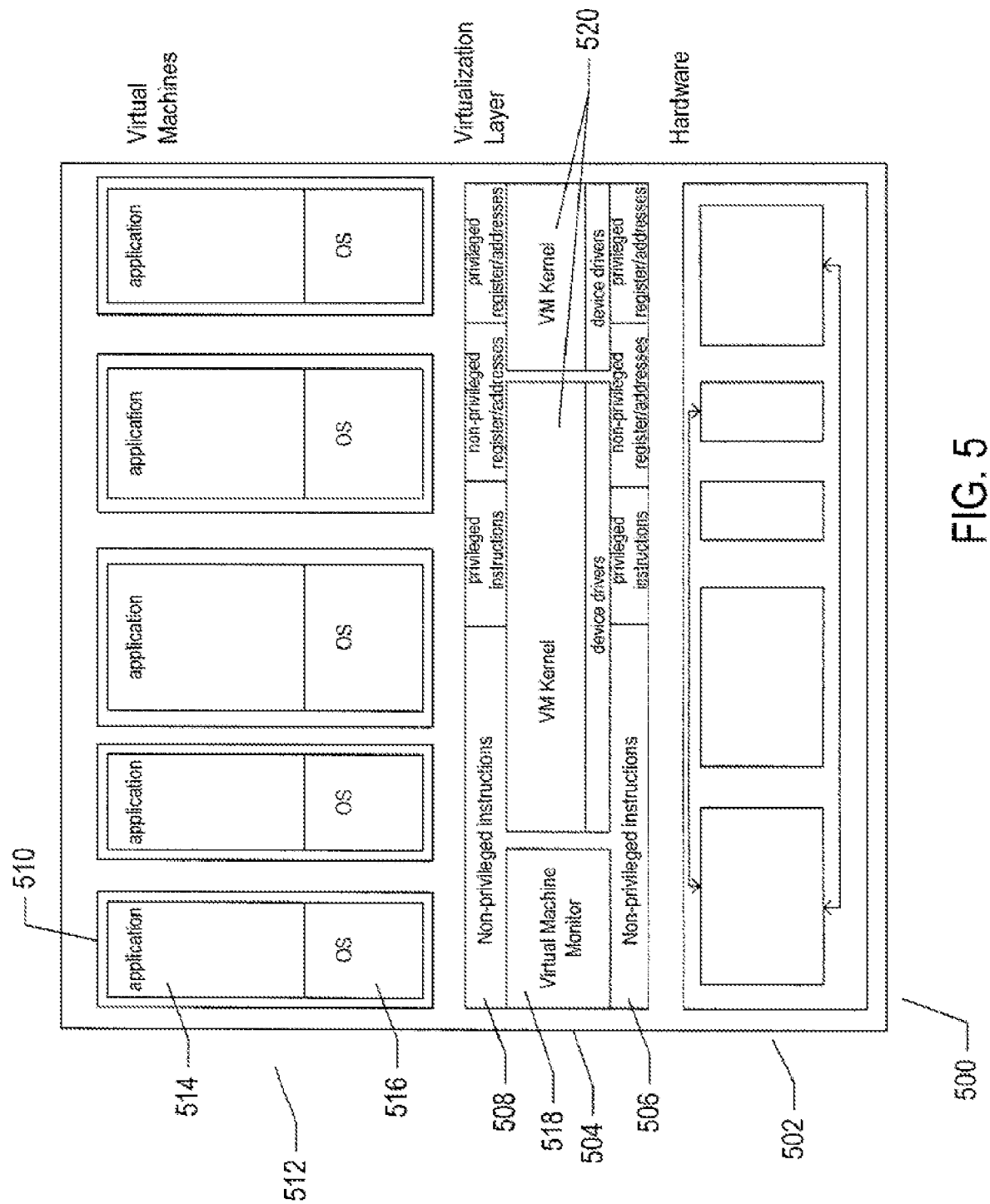
FIG. 5 illustrates one type of virtual machine and virtual-machine execution environment.

For all of these reasons, a higher level of abstraction, referred to as the "virtual machine," has been developed and evolved to further abstract computer hardware in order to address many difficulties and challenges associated with traditional computing systems, including the compatibility issues discussed above. FIG. 5 illustrates one type of virtual machine and virtual-machine execution environment. FIG. 5 uses the same illustration conventions as used in FIG. 4. In particular, the computer system 500 in FIG. 5 includes the same hardware layer 502 as the hardware layer 402 shown in FIG. 4. However, rather than providing an operating system layer directly above the hardware layer, as in FIG. 4, the virtualized computing environment illustrated in FIG. 5 features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, such as application 514 and operating system 516 packaged together within virtual machine 510. Each virtual machine is thus equivalent to the operating-system layer 404 and application-program layer 406 in the general-purpose computer system shown in FIG. 4. Each operating system within a virtual machine interfaces to the virtualization-layer interface 508 rather than to the actual hardware interface 506. The virtualization layer partitions hardware resources into abstract virtual-hardware layers to which each operating system within a virtual machine interfaces. The operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different operating systems. For example, the virtualization layer is generally able to provide virtual hardware interfaces for a variety of different types of computer hardware. This allows, as one example, a virtual machine that includes an operating system designed for a particular computer architecture to run on hardware of a different architecture. The number of virtual machines need not be equal to the number of physical processors or even a multiple of the number of processors. The virtualization layer includes a virtual-machine-monitor module 518 that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines. The kernel, for example, maintains shadow page tables on each virtual machine so that hardware-level virtual-memory facilities can be used to process memory accesses. The kernel additionally includes routines that implement virtual communications and data-storage devices as well as device drivers that directly control the operation of underlying hardware communications and data-storage devices. Similarly, the kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

Figure 6:
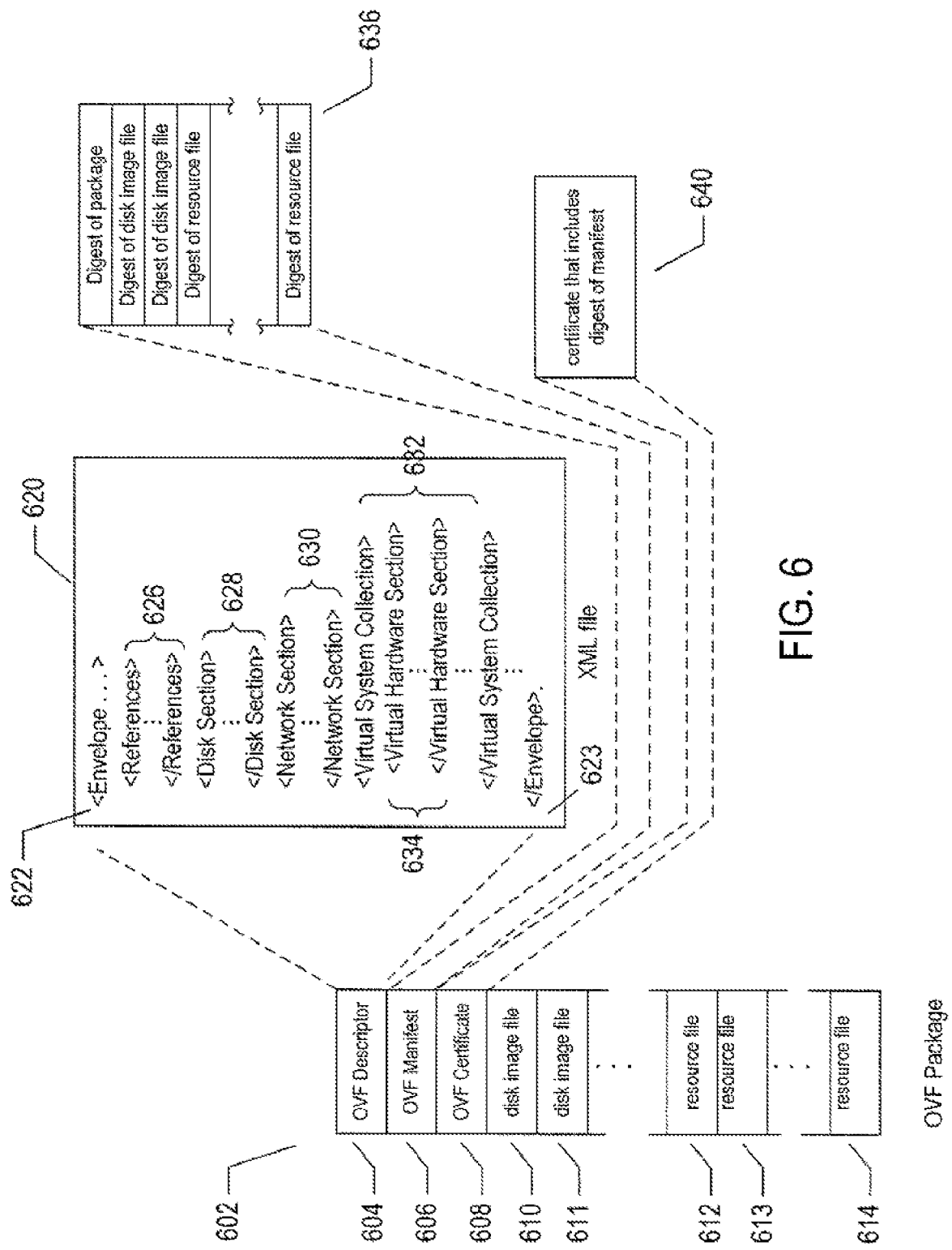
FIG. 6 illustrates an OVF package.

A virtual machine is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of crypto-graphic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
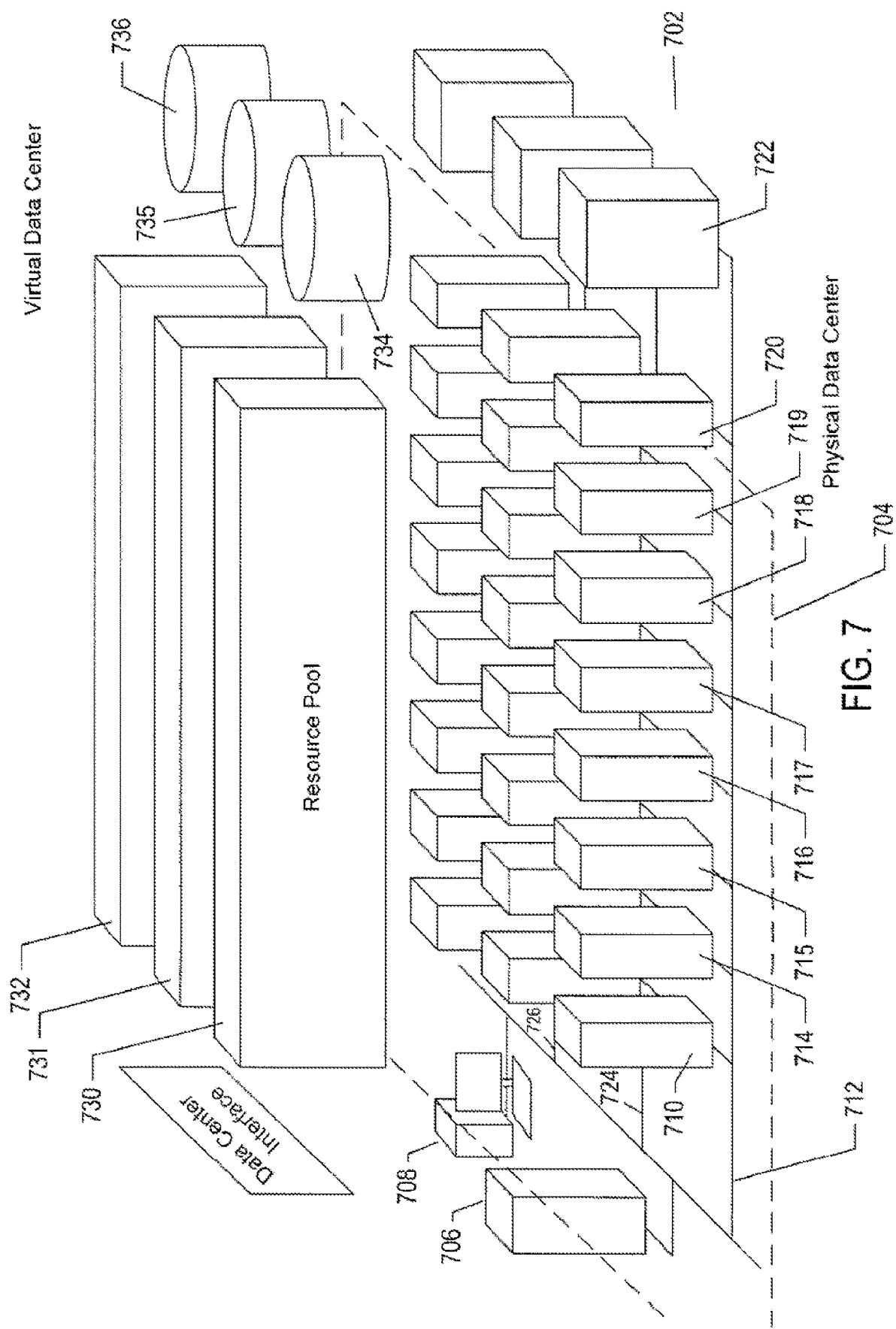
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
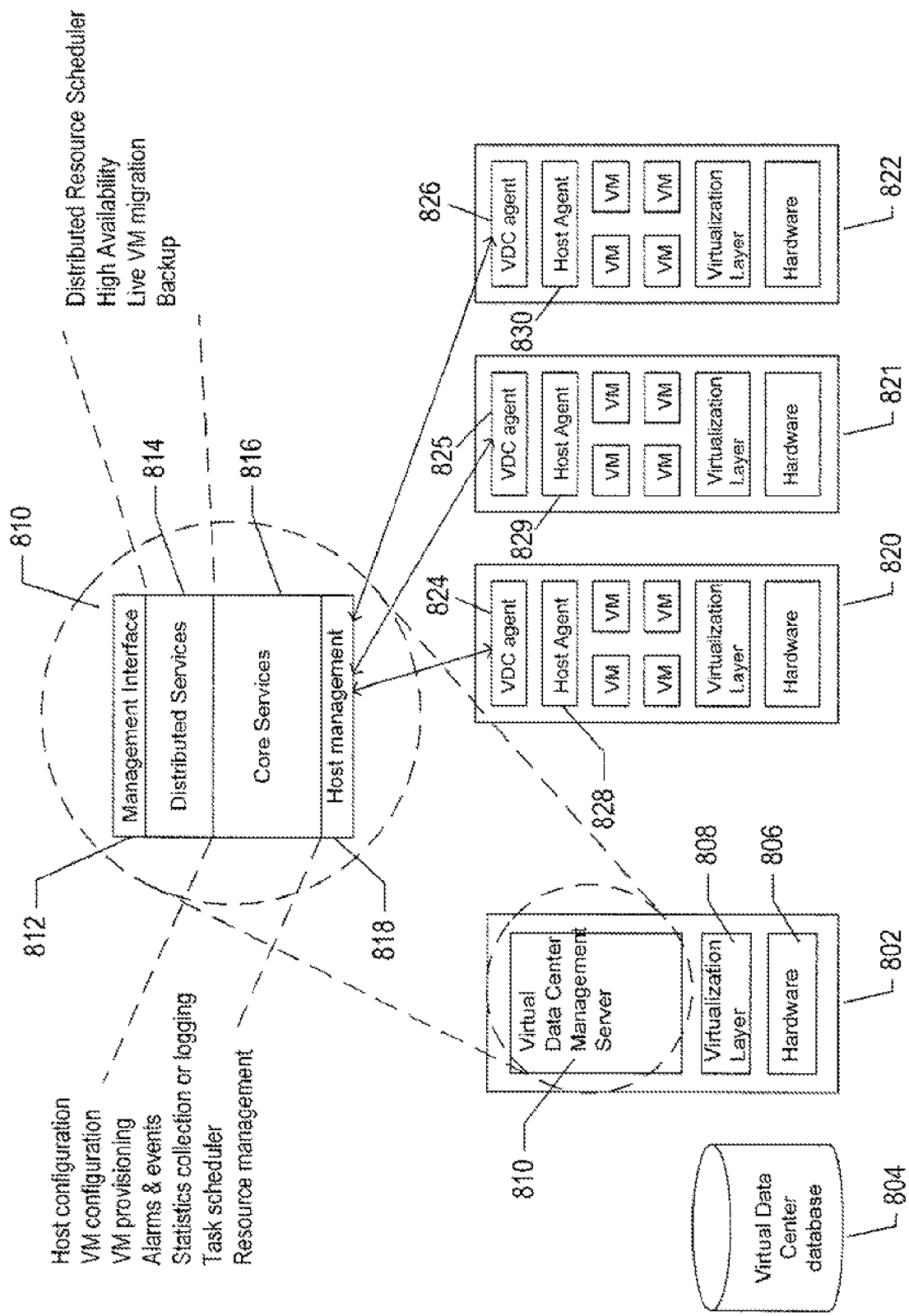
FIG. 8 illustrates virtual-machine components of a virtual-data-center management server and physical servers of a physical data center above which a virtual-data-center interface is provided by the virtual-data-center management server.

FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for off-loading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
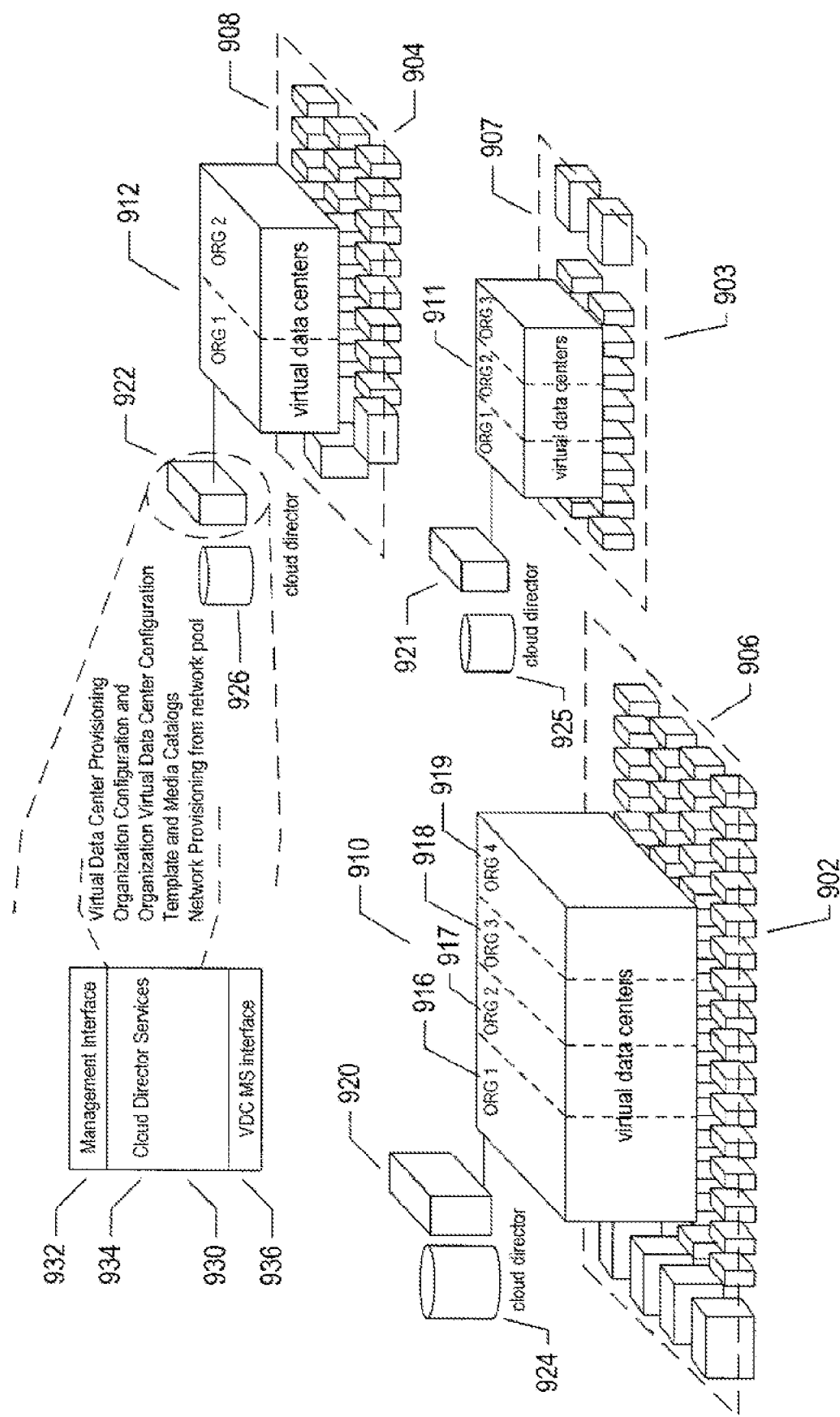
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A vAPP template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities. The present application is directed to providing an additional layer of abstraction to facilitate aggregation of cloud-computing facilities.

Figure 10:
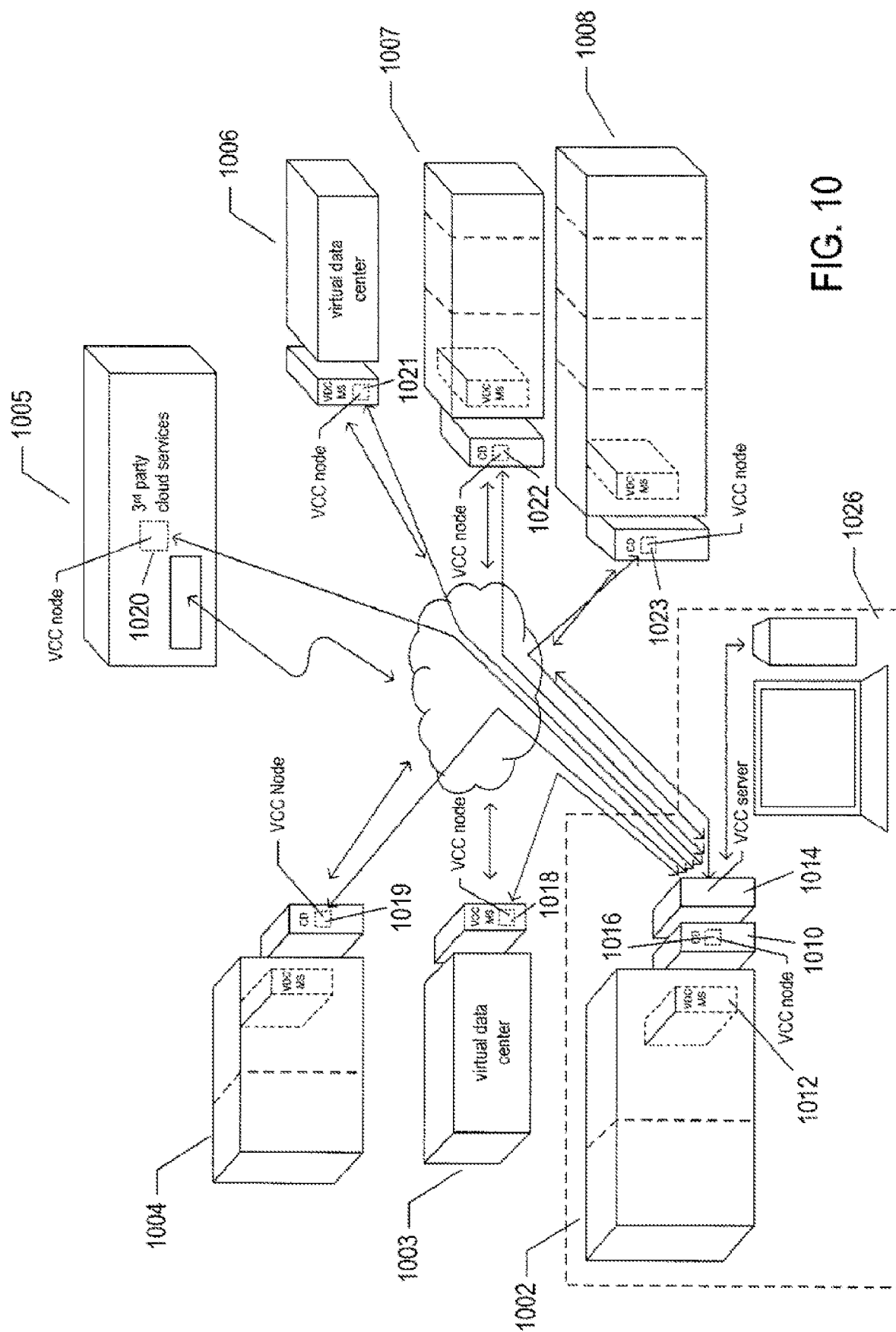
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
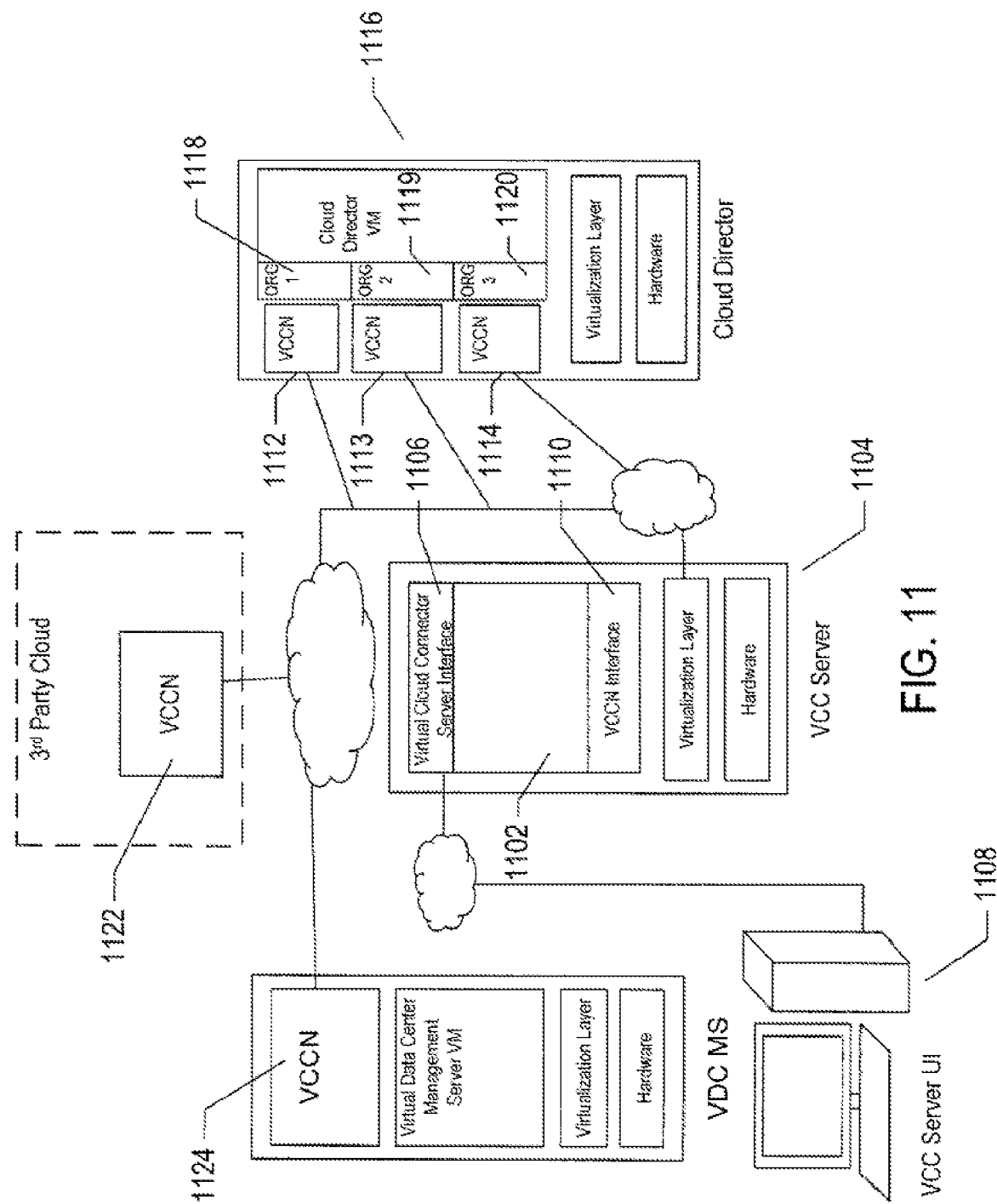
FIG. 11 illustrates the VCC server and VCC nodes in a slightly different fashion than the VCC server and VCC nodes are illustrated in FIG. 10.

FIG. 11 illustrates the VCC server and VCC nodes in a slightly different fashion than the VCC server and VCC nodes are illustrated in FIG. 10. In FIG. 11, the VCC server virtual machine 1102 is shown executing within a VCC server 1104, one or more physical servers located within a private cloud-computing facility. The VCC-server virtual machine includes a VCC-server interface 1106 through which a terminal, PC, or other computing device 1108 interfaces to the VCC server. The VCC server, upon request, displays a VCC-server user interface on the computing device 1108 to allow a cloud-aggregate administrator or other user to access VCC-server-provided functionality. The VCC-server virtual machine additionally includes a VCC-node interface 1108 through which the VCC server interfaces to VCC-node virtual appliances that execute within VDC management servers, cloud directors, and third-party cloud-computing facilities. As shown in FIG. 11, in one implementation, a VCC-node virtual machine is associated with each organization configured within and supported by a cloud director. Thus, VCC nodes 1112-1114 execute as virtual appliances within cloud director 1116 in association with organizations 1118-1120, respectively. FIG. 11 shows a VCC-node virtual machine 1122 executing within a third-party cloud-computing facility and a VCC-node virtual machine 1124 executing within a VDC management server. The VCC server, including the services provided by the VCC-server virtual machine 1102, in conjunction with the VCC-node virtual machines running within remote VDC management servers, cloud directors, and within third-party cloud-computing facilities, together provide functionality distributed among the cloud-computing-facility components of either heterogeneous or homogeneous cloud-computing aggregates.

Figure 12:
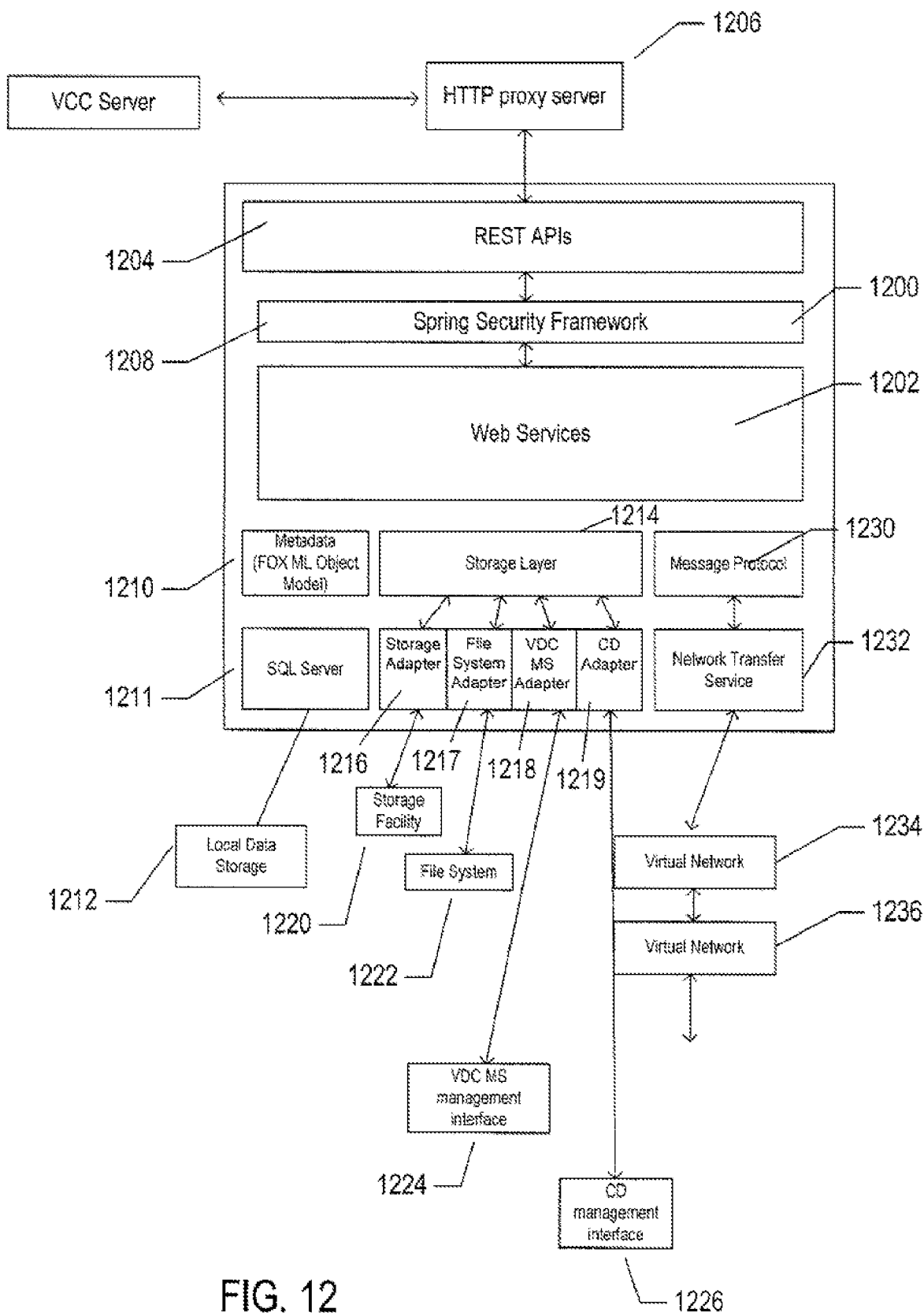
FIG. 12 illustrates one implementation of a VCC node.

FIG. 12 illustrates one implementation of a VCC node. The VCC node 1200 is a web service that executes within an Apache/Tomcat container that runs as a virtual appliance within a cloud director, VDC management server, or third-party cloud-computing server. The VCC node exposes web services 1202 to a remote VCC server via REST APIs accessed through the representational state transfer ("REST") protocol 1204 via a hypertext transfer protocol ("HTTP") proxy server 1206. The REST protocol uses HTTP requests to post data and requests for services, read data and receive service-generated responses, and delete data. The web services 1202 comprise a set of internal functions that are called to execute the REST APIs 1204. Authorization services are provided by a spring security layer 1208. The internal functions that implement the web services exposed by the REST APIs employ a metadata/object-store layer implemented using an SQL Server database 1210-1212, a storage layer 1214 with adapters 1216-1219 provides access to data stores 1220, file systems 1222, the virtual-data-center management-server management interface 1224, and the cloud-director management interface 1226. These adapters may additional include adapters to $3^{rd}$-party cloud management services, interfaces, and systems. The internal functions that implement the web services may also access a message protocol 1230 and network transfer services 1232 that allow for transfer of OVF packages and other files securely between VCC nodes via virtual networks 1234 that virtualize underlying physical networks 1236. The message protocol 1230 and network transfer services 1232 together provide for secure data transfer, multipart messaging, and checkpoint-restart data transfer that allows failed data transfers to be restarted from most recent checkpoints, rather than having to be entirely retransmitted.

The VCC node, packaged inside an OVF container, is available to the cloud-director servers and VDC management servers for deployment as a virtual-appliance. The VCC node is deployed as a virtual appliance, containing one virtual machine in this case, and is launched within the cloud-director servers and VDC management servers in the same fashion as any other virtual machine is installed and launched in those servers. When the VCC node starts up, a cloud administrator accesses an administrative interface offered as one of the VCC node's web services. This administrative interface, along with a similar administrative interface provided as a web service by the VCC server running within a VDC management server/cloud-director, allows an administrator of the cloud or organization in which the VCC node is being installed to configure and register the VCC node.

Figure 13:
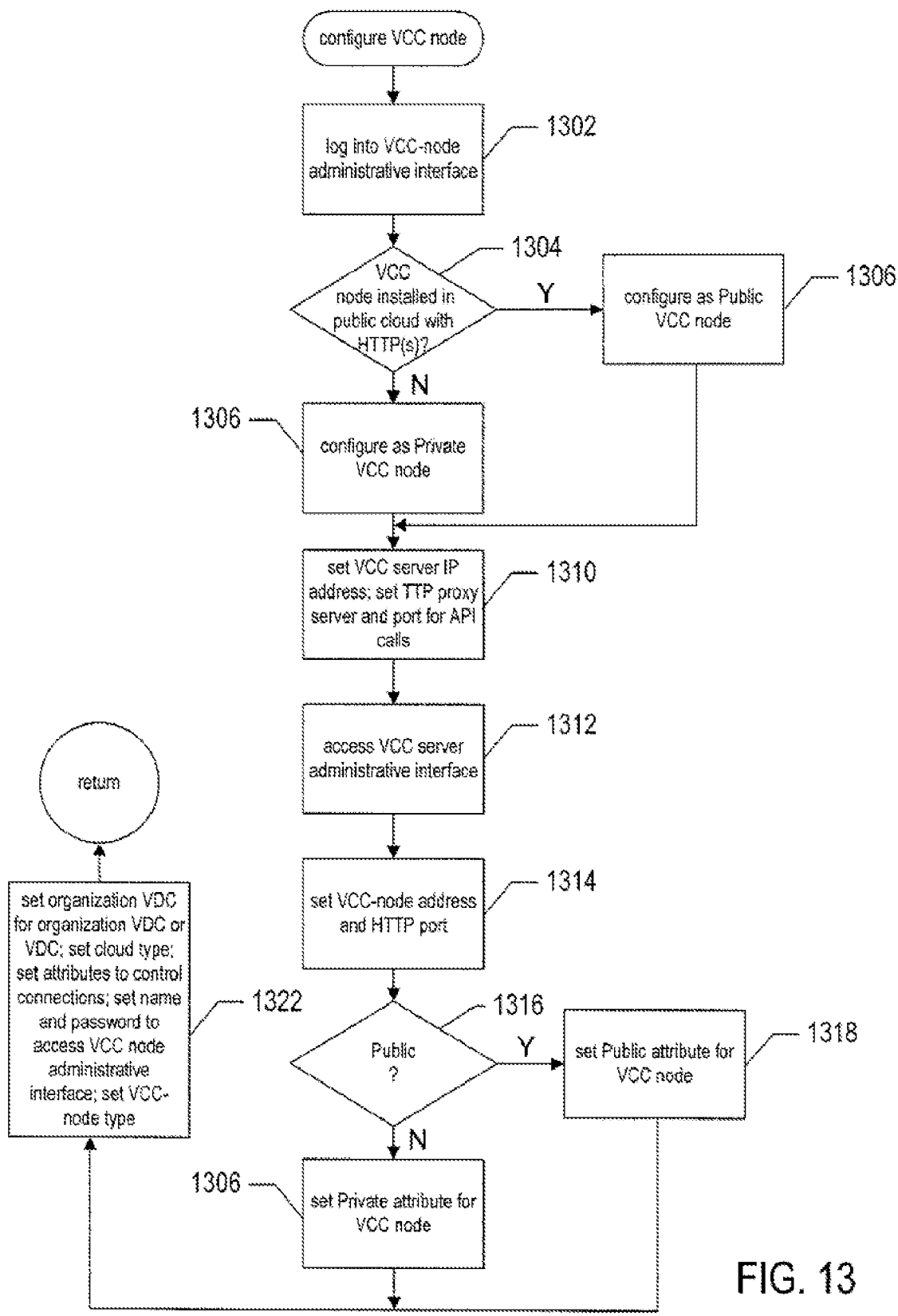
FIG. 13 provides a control-flow diagram that illustrates configuration and registration of a VCC node through the administrative interface provided as a web service.

FIG. 13 provides a control-flow diagram that illustrates configuration and registration of a VCC node through the administrative interface provided as a web service by the VCC node. In step 1302, an administrator of the cloud organization or cloud into which the VCC node has been installed logs into the VCC node through the VCC-node's administrative interface. Next, in step 1304, the administrator determines whether or not the VCC node has been installed in a public cloud or a private cloud with secure HTTP connections to external entities. When installed in a public cloud with secure HTTP, the administrator configures the VCC node as a public VCC node in step 1306, using a configuration tool or input to the administrative interface. Otherwise, the administrator configures the VCC node as a private VCC node, in step 1308. This is done for the VCC-Server controller to direct requests to the appropriate VCC node based on whether it is private or public. A private VCC node is able to access all public VCC nodes and their associated cloud services, whereas a public VCC node may not be able to access a private VCC-node-backed cloud service in all cases, as the private VCC node may lie behind a corporate firewall. Next, in step 1310, the administrator inputs, through the administrative interface, the IP address of the VCC server that will connect to and manage the VCC node and inputs an identification of the HTTP proxy server and port through which the VCC node receives VCC-node application-program-interface ("API") calls from the managing VCC server and from other VCC nodes. Next, in step 1312, the administrator accesses the administrative interface of the remote VCC server that will manage the VCC node in order to register the VCC node with the remote VCC server. In step 1314, the administrator enters the IP address of the proxy server through which the VCC node receives API calls and the HTTP port through which the VCC node receives API calls. When the VCC node is a public VCC node, as determined again by the administrator in step 1316, the administrator sets a public attribute to characterize the VCC node to the VCC server through the VCC-server administrative interface in step 1318. Otherwise, in step 1320, the administrator sets a private attribute for the VCC node. Finally, in step 1322, the administrator enters various additional information into the VCC-server administrative interface to complete registration of the VCC node. This information may include the URL for the organization or cloud in which the VCC node is being installed, an indication of the cloud type, such as, for example, whether the cloud is a virtual-data center managed by a VDC management server or organization virtual-data center managed by a cloud director. The administrator additionally enters, through the VCC-server administrative interface, various attributes that control the process by which the VCC-server establishes connections with the VCC node, including whether or not the VCC-server should use a proxy to connect to the VCC node and whether or not a secure-socket-layer ("SSL") certificate should be employed in establishing and exchanging information through the connection. Additional information entered by the administrator through the VCC-server administrative interface may include the name and password that the VCC server should use to log into the VCC node as well as an indication of the type of services that the VCC node is capable of performing on behalf of the VCC server. In many implementations, a variety of different types of VCC nodes may be installed into clouds, each type providing different services and other capabilities to the VCC servers that manage them as well as to other VCC nodes that request services from the VCC node.

Once a VCC node has been installed, launched, configured, and registered within an organization cloud or a cloud managed by a VDC management server, the VCC node essentially waits to receive requests for login and for services through the VCC-node API-call interface and, upon receiving such requests, fulfills them. Those requests that involve multiple VCC nodes are fulfilled by coordinating the requests with the other VCC nodes. The VCC nodes act as a delegated, distributed set of remote servers within remote clouds on behalf of the VCC server controller that manages the VCC nodes.

Figure 14:
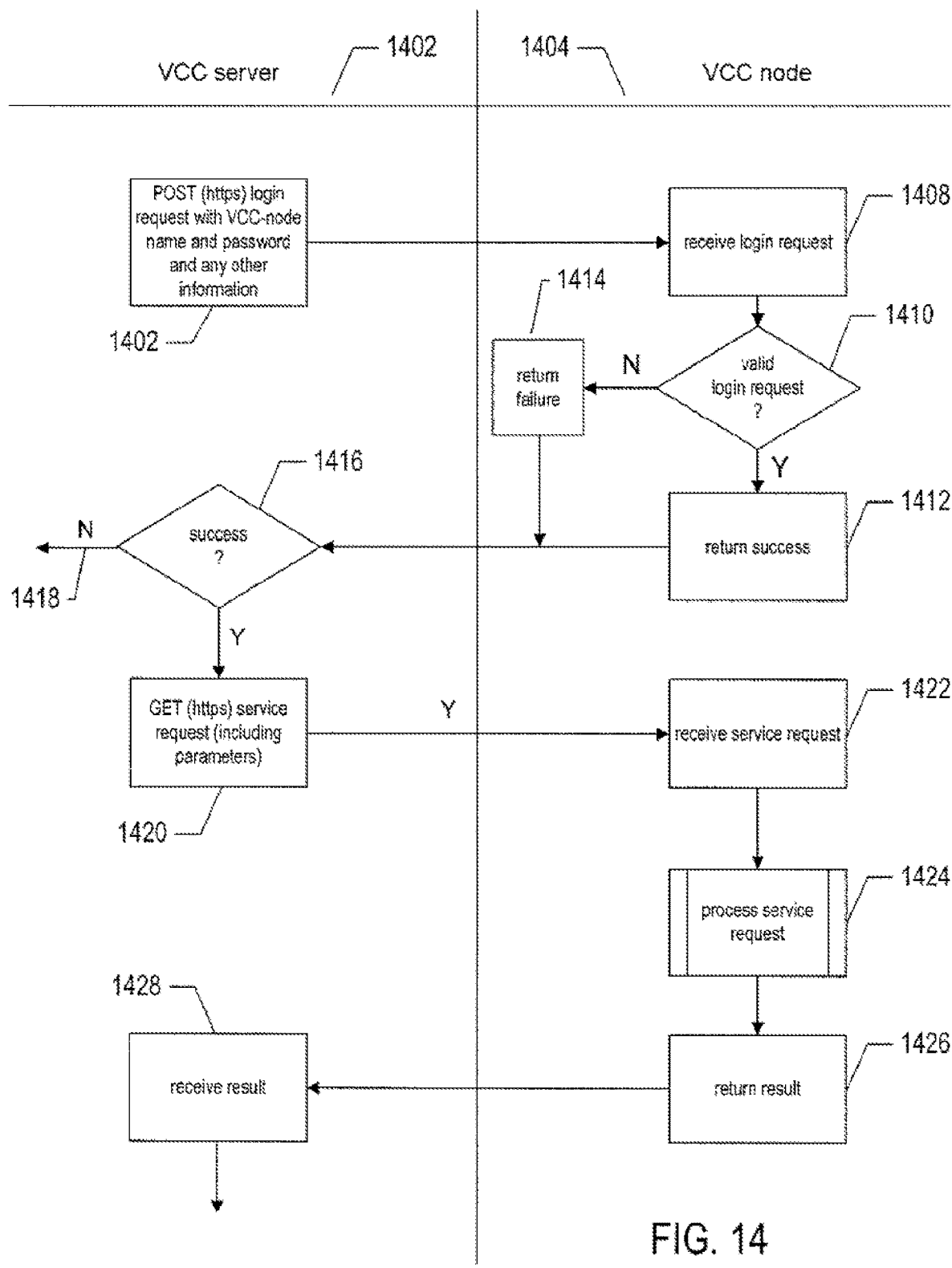
FIGS. 14-16 provide control-flow diagrams that illustrate a general service-request-processing operation of a VCC node.
Figure 15:
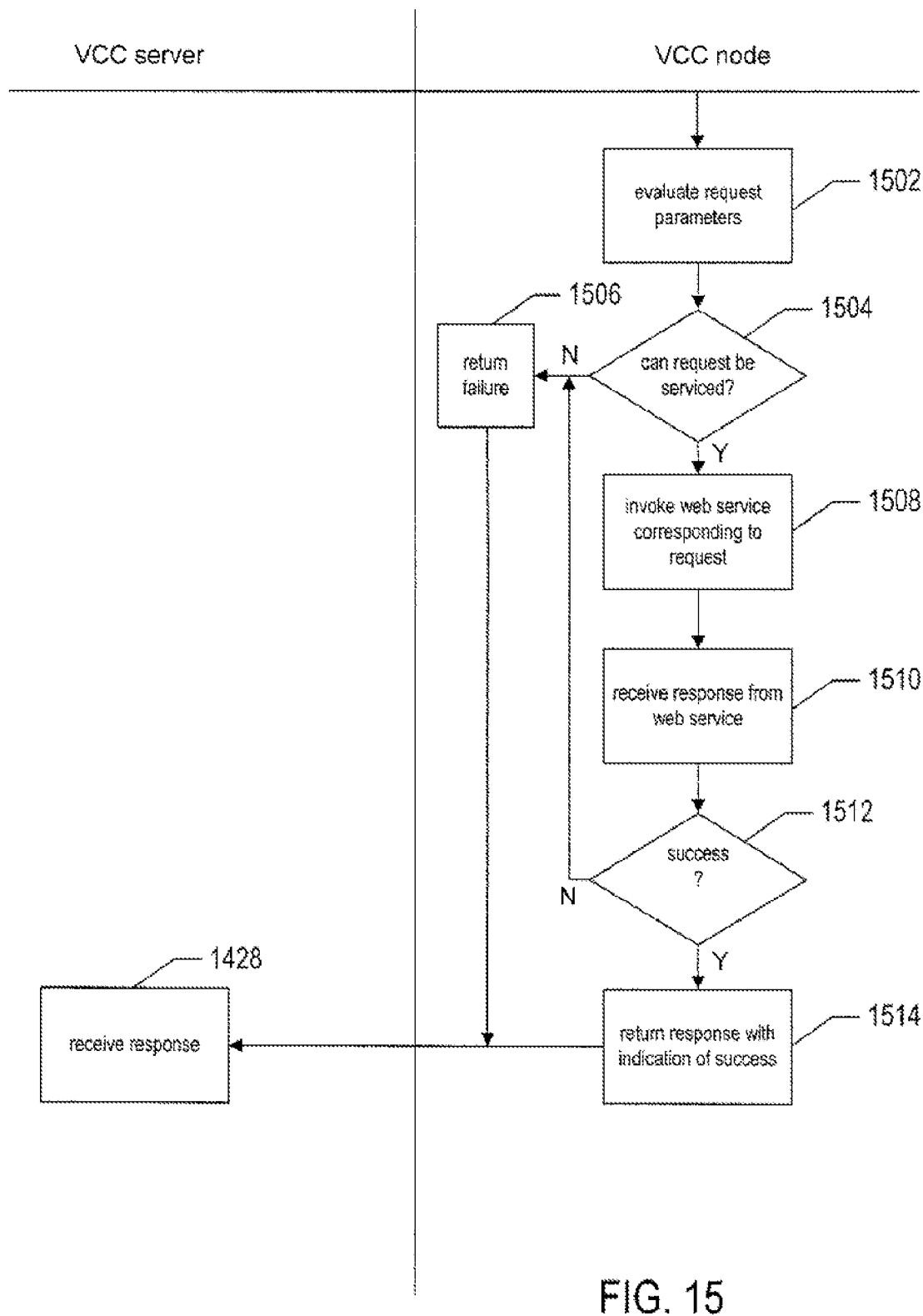
Figure 16:
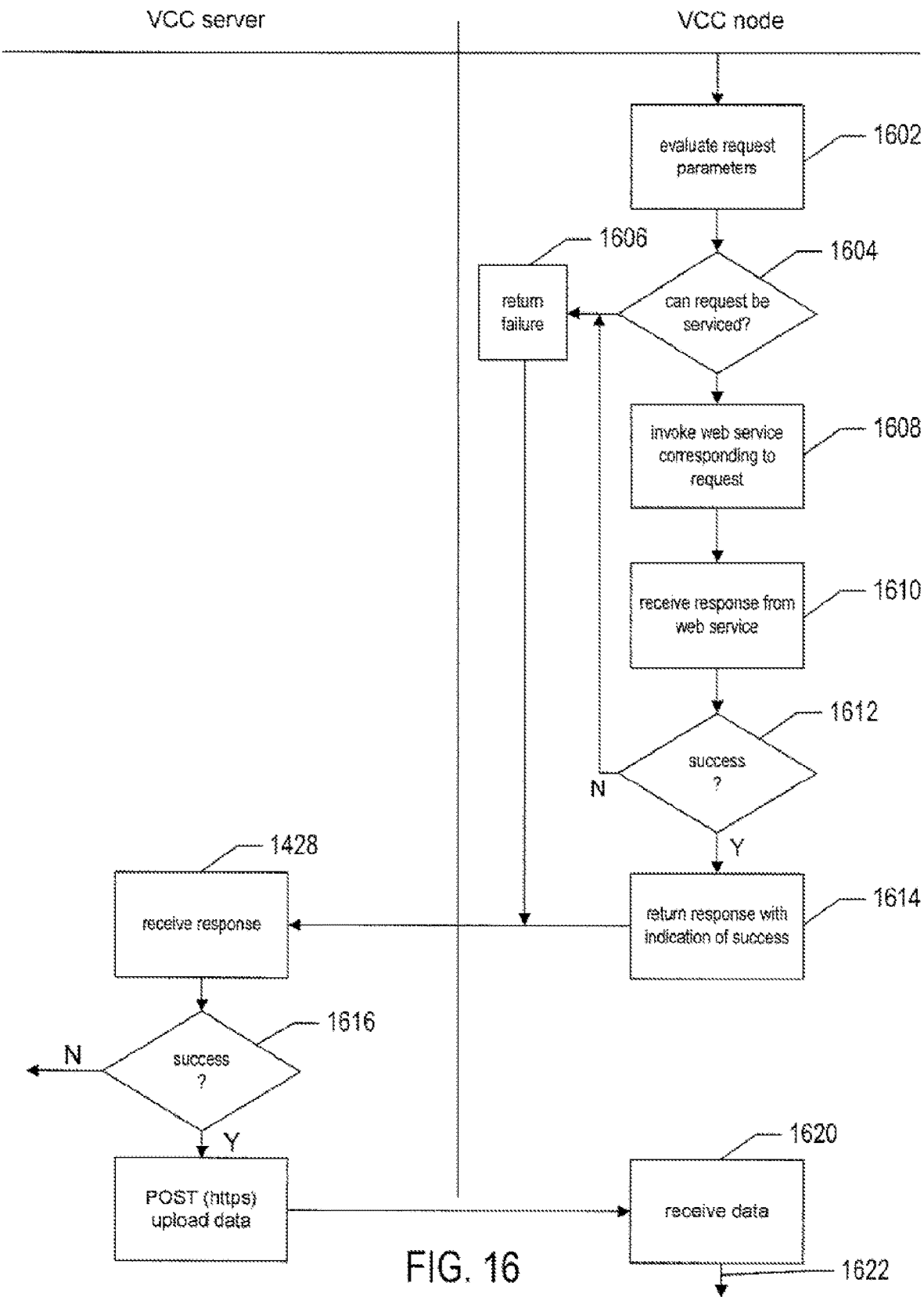

FIGS. 14-16 provide control-flow diagrams that illustrate a general service-request-processing operation of a VCC node. FIG. 14 provides a control-flow diagram for overall request processing by a VCC node. In FIG. 14, as in subsequent FIGS. 15-19, actions performed by two different entities are shown, with the actions performed by the first entity shown in the left-hand portion of the FIG. 1402 and actions performed by the second of the two entities shown in the right-hand portion of FIG. 14 1404. In the case of FIG. 14, the first entity is a VCC server and the second entity is a VCC node. In step 1406, the VCC server, using the HTTP POST command, transmits a login request to the VCC node, supplying, in the request, the name and password for the VCC node and any other information needed to be passed to the VCC node in order to request login. In step 1408, the VCC node receives the login request and processes the included information to determine whether or not the login request should be carried out. When the login request is determined to be valid, in step 1410, the VCC node returns an indication of success, in step 1412. Otherwise, the VCC node returns an indication of failure in step 1414. Receiving the response from the VCC node, the VCC server determines whether or not the response indicates a successful login, in step 1416. When not, the VCC server may either retry the login request or undertake other actions to handle the login-request failure. These additional actions are not shown in FIG. 14, and are instead indicated by the arrow 1418 emanating from step 1416. When the login request has been successful, as determined in step 1416, the VCC server issues a GET HTTP request command to request a particular service from the VCC node, the GET request including, when specified by the API interface, information, as parameters, needed by the VCC node to service the request, in step 1420. In step 1422, the VCC node receives the request for service, processes the request in step 1424, and returns a result in step 1426. The VCC server receives the result, in step 1428, and continues with whatever VCC-server tasks were underway at the time the login service was requested. In certain implementations, when all service requests that need to be issued by the VCC server have been issued and responses have been received for the requests from the VCC node, the VCC server may explicitly log out from the VCC node. There may be additional VCC-server and VCC-node interactions involved when servicing of a request fails.

FIG. 15 provides a control-flow diagram for the process service request in step 1424 of FIG. 14 for a general service request. In step 1502, the VCC node evaluates the parameters and other information included with the service request and determines, in step 1504, whether or not the request can be serviced. When the request cannot be serviced, the VCC node returns a failure indication in step 1506. Otherwise, the VCC node invokes one of the web services that correspond to the request in step 1508 in order to process the request. When the web service returns a response, in step 1510, the VCC node determines whether or not the service has been successfully processed in step 1512. When the request has not been successfully processed, control flows to step 1506 in which an indication of failure is returned to the VCC server. Otherwise, an indication of success is returned to the VCC server, in step 1514, along with additional information produced for the VCC server as part of processing of the request.

FIG. 16 indicates an alternative version of the process-service-request step 1424 in FIG. 14 when the request involves transfer of information from the VCC server to the VCC node. Steps 1602-1614 in FIG. 16 are identical to steps 1502-1514 in FIG. 15, and are not further described. However, in the case that the request by the VCC server involves transfer of information from the VCC server to the VCC node, upon receiving the response from the VCC node, in step 1428, and in the case that the response indicates success, as determined in step 1616, the VCC server then issues an HTTP POST command to the VCC node, in step 1618, to transfer the information to the VCC node, which receives this information in step 1620. Additional steps, represented by arrow 1622, may be carried out by the VCC node upon receiving the data, including returning an indication of successful reception.

Figure 17:
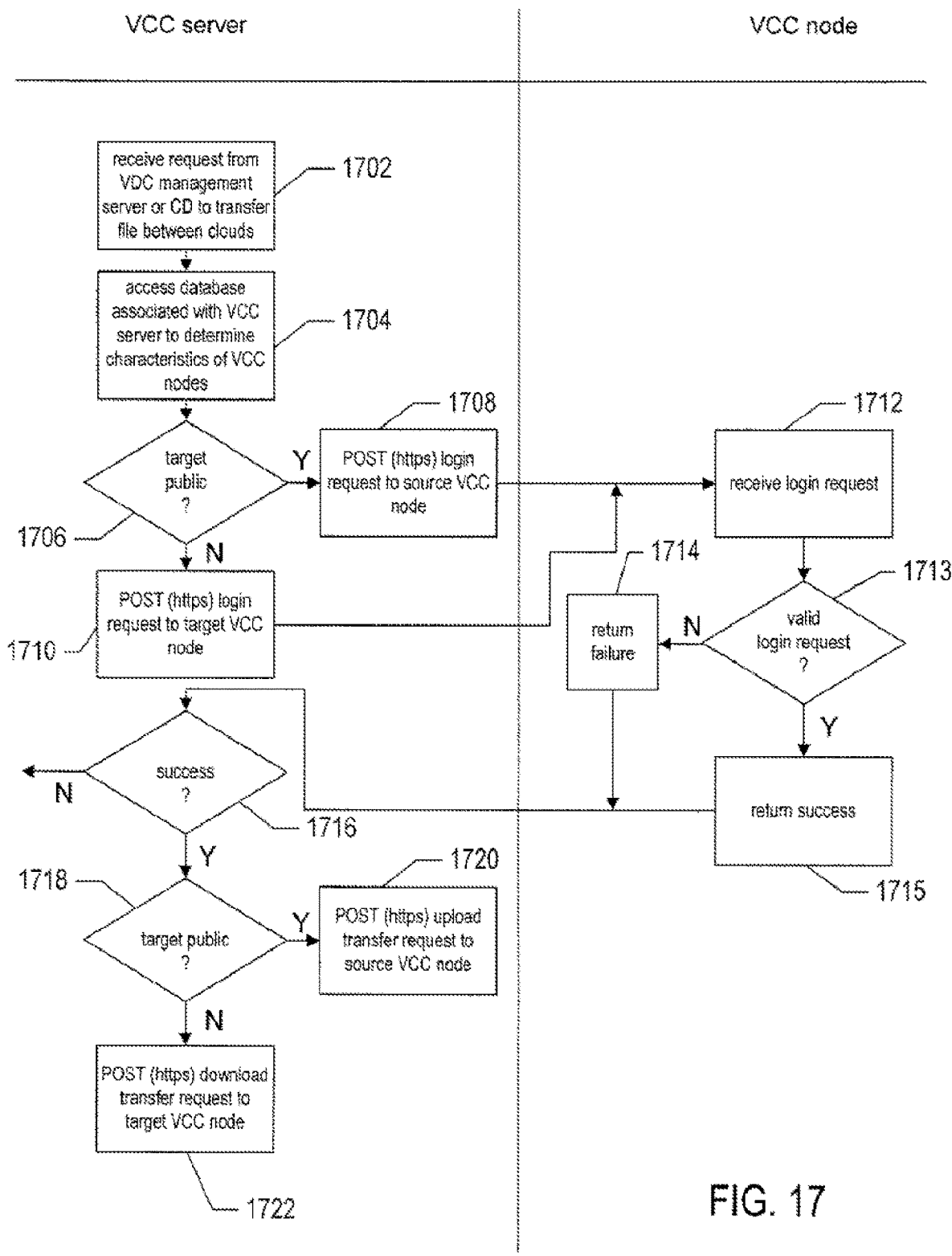
FIGS. 17-19 illustrate a more complex, file-transfer service request that may be issued by a VCC server to a VCC node, which, in turn, interacts with a second VCC node to carry out the requested file transfer.
Figure 18:
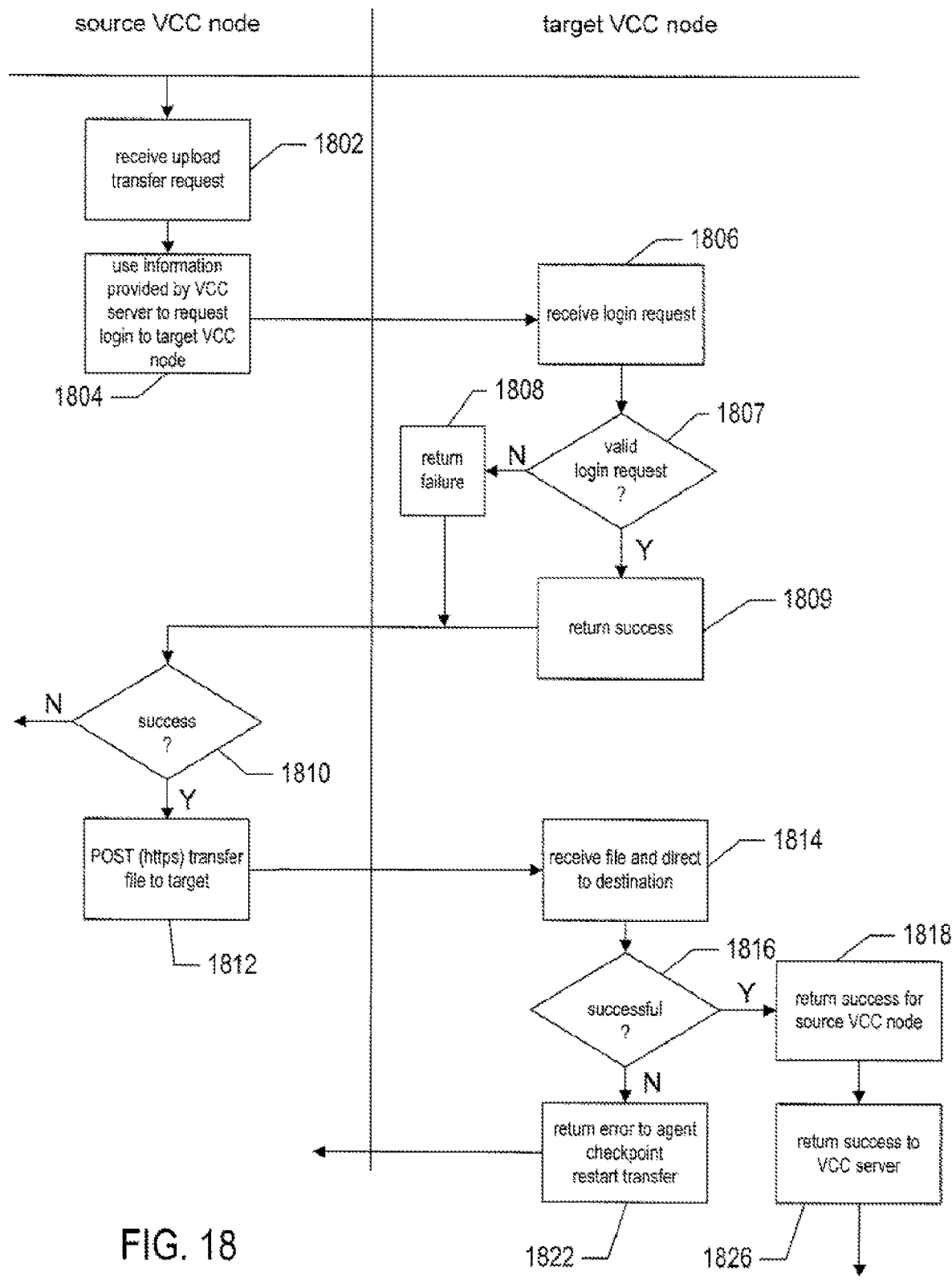
Figure 19:
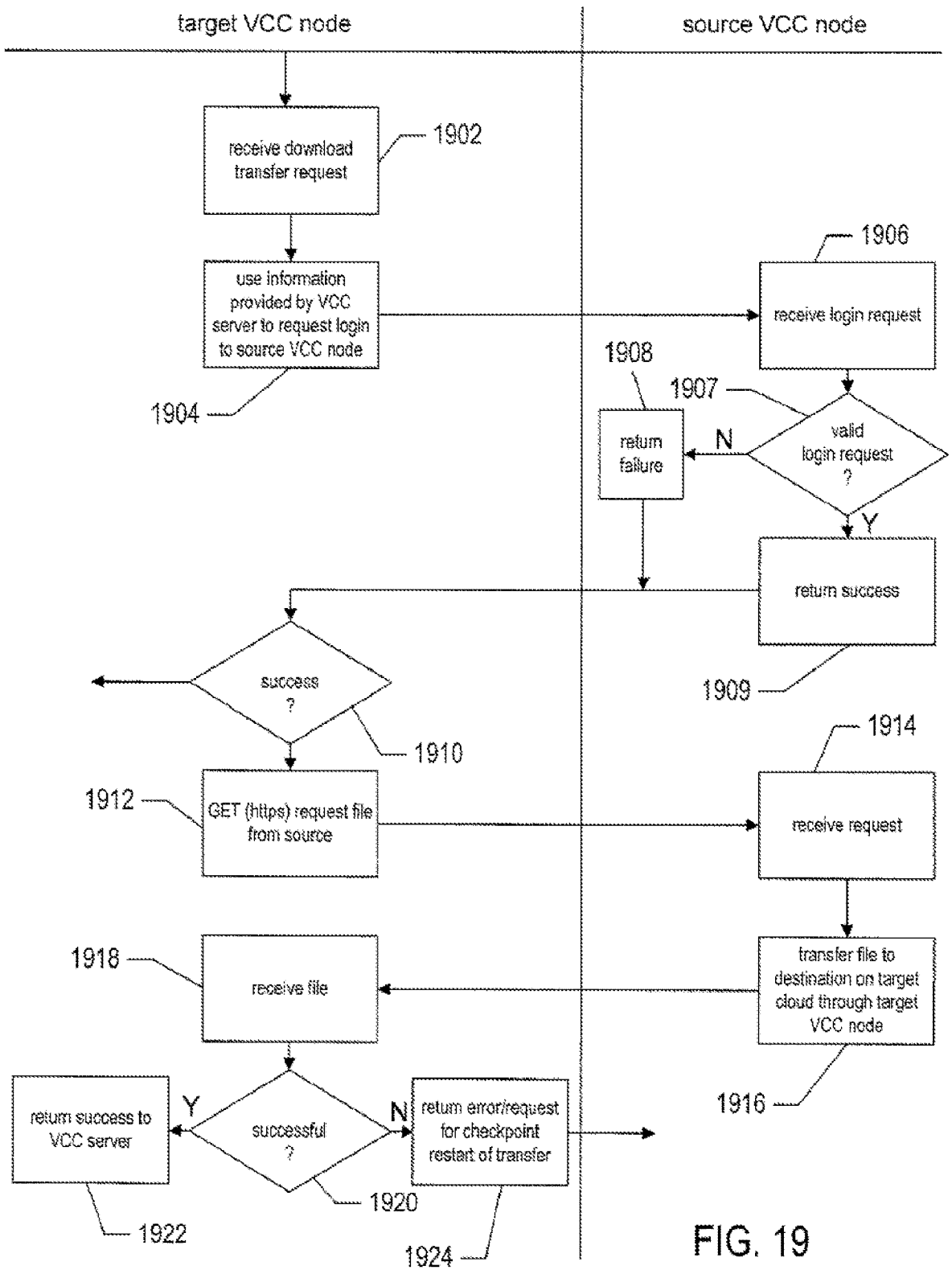

FIGS. 17-19 illustrate a more complex, file-transfer service request that may be issued by a VCC server to a VCC node, which, in turn, interacts with a second VCC node to carry out the requested file transfer. In step 1702, the VCC server receives a request from a VDC management server or cloud director ("CD") to transfer a file between two different clouds. In step 1704, the VCC server accesses a database associated with the VCC server to determine the characteristics of the clouds between which the files are to be transferred as well as the characteristics of the VCC nodes managed by the VCC server within those clouds. When the target cloud is public, as determined in step 1706, the VCC server posts a login request to the source VCC node for the file transfer in step 1708. Otherwise, the VCC server posts a login request to the target VCC node for the file transfer in step 1710. The VCC node which receives either of these POST requests carries out already-described login-request processing in steps 1712-1715. When the login request is successful, as determined in step 1716 by the VCC server, and when the target of the file transfer is a public cloud in which a public VCC node is executing, as determined in step 1718, the VCC server posts an upload-transfer request to the source VCC node for the file transfer in step 1720. Otherwise, the VCC server posts a download transfer request to the target VCC node for the file transfer in step 1722.

FIG. 18 illustrates the remaining portion of the file-transfer operation invoked by the VCC server in step 1720 in FIG. 17. The source VCC node, in step 1802, receives the upload transfer request and, in step 1804, using information provided by the VCC server to the source VCC node, requests login to the target VCC node. In steps 1806-1809, the target VCC node processes the login request as previously described. When, in step 1810, the source VCC node receives a response to the login request from the target VCC node, and the response indicates a successful login, the source VCC node issues a post command, in step 1812, to transfer the file to the target VCC node. In step 1814, the target VCC node receives the file and directs the file to an appropriate destination within the cloud in which the target VCC node executes. The destination nay be specified by the VCC server in the initial file-transfer request or may be determined by the target VCC node using information included in the file-transfer request either by the VCC server or by the source VCC node, depending on the particular file-transfer command and on the particular implementation. When the file transfer is carried out successfully, as determined in step 1816, the target VCC node returns an indication of success to the source VCC node in step 1818 and an indication of success to the VCC server in step 1820. Otherwise, when the file has not been successfully transferred, the target VCC node may return an indication of error to the source VCC node and initiate a checkpoint restart of the file transfer in step 1822. Checkpoint restarts are made possible by logging checkpoints within the file transfer on both the source VCC node and target VCC node to allow the two VCC nodes to cooperate, when an error occurs partway through the file transfer, to roll back the file-transfer process to a most recent checkpoint, on both VCC nodes, and resume the file transfer from that point.

FIG. 19 provides a control-flow diagram for completion of the file-transfer operation initiated in step 1722 of FIG. 17. Steps 1902 through 1910 are equivalent to steps 1802 through 1810, in FIG. 18, and are not therefore further described. In step 1912, a target VCC node issues an HTTPS GET request for the file to the source VCC node. The source VCC node receives the GET request in step 1914 and initiates file transfer to the target VCC node in step 1916. The file is transferred to a destination either specified by the VCC server in the initial file-transfer request, or may be alternatively determined by either the target VCC node using VCC-server-provided information or by the source VCC node, in different implementations for different types of file transfers. In step 1918, the target VCC node receives the file and, when the file has been successfully transferred, as determined in step 1920, returns success to the VCC server in step 1922. Otherwise, as in step 1822 of FIG. 18, the target VCC node, in step 1924, may initiate checkpoint restart of the file transfer by returning an error indication to the source VCC node in step 1924. The VCC server initiates an upload transfer, in step 1720 of FIG. 17, in the case that the target VCC node is in a public cloud and is characterized as a public VCC node, because a public VCC node is not screened off by a firewall from the source VCC node. By contrast, the VCC-server issues a download transfer request to the target VCC node, in the case that the target VCC node resides in a private cloud, because, in that case, the target VCC node is likely to be prevented from receiving unsolicited data transfers by a firewall or other security mechanisms.

As discussed above, the combination of a VCC server and VCC nodes installed within VDC management servers, cloud directors, and third-party clouds provides the VCC server with the ability to access VCC nodes managed by the VCC server in remote clouds, including web services provided by the remote VCC nodes, and allows the VCC server to transfer files and other data from one cloud to another through VCC nodes within the clouds. In a first-level abstraction, the VCC server and VCC nodes managed by the VCC server provide secure communications between the VCC server and remote clouds and a REST-protocol-based API call interface to VCC nodes residing within remote clouds. This first level of abstraction associated with VCC servers and VCC nodes is the basis for a broader, aggregate-cloud-management-level of abstraction to which the current application is directed.

Figure 20:
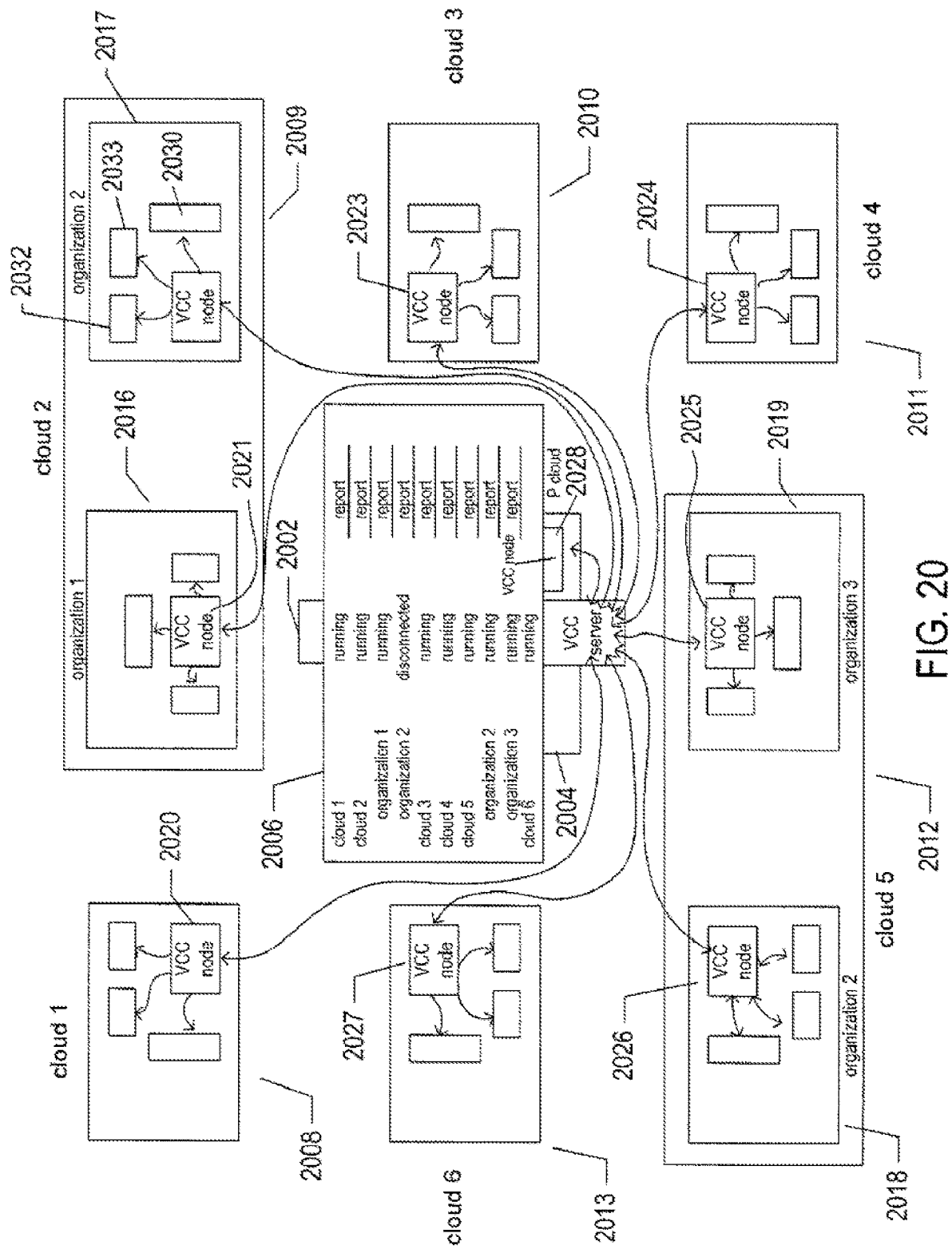
FIG. 20 provides an illustration of aggregate-cloud management via the VCC server and VCC nodes managed by the VCC server.

FIG. 20 provides an illustration of aggregate-cloud management via the VCC server and VCC nodes managed by the VCC server. In FIG. 20, the VCC server 2002 runs within the context of a private cloud 2004 and provides an aggregate-cloud management interface 2006 with respect to the private cloud 2004 and six additional, remote clouds 2008-2013. Two of these remote clouds 2009 and 2012 include multiple organization virtual data centers 2016-2017 and 2018-2019, respectively. Clouds 2009 and 2012, therefore, are managed by a cloud director while clouds 2008, 2010-2011, and 2013 may be clouds managed by a virtual-data-center management director or may be third-party clouds. The multi-cloud aggregation may include only remote clouds of one type, such as clouds managed by VDC management servers, and thus may be homogeneous cloud aggregations. Alternatively, the multiple remote clouds may be of various different types, and thus may together comprise a heterogeneous cloud aggregation. As discussed above, the VCC nodes 2020-2028 within the local private cloud and remote clouds contain various types of adapters that allow the VCC nodes to interface to management interfaces within cloud-director-managed clouds, VDC-management-server-managed clouds, and third-party clouds. In addition, the VCC nodes include adapters that allow the VCC nodes to access data-storage facilities within the clouds in which they reside, networking facilities, and allow the VCC nodes to interface to virtual appliances and applications executing within the remote clouds. For simplicity of illustration, each VCC node 2020-2028 in FIG. 20 is shown to interface with a cloud-management interface 2030 and two applications 2032-2033 for VCC node 2002.

When the VCC server is appropriately configured with a cloud-aggregation management application, the VCC server can provide a cloud-aggregation management interface 2006 that allows an administrator to monitor and manage an entire cloud aggregation comprising many different remote virtual data centers running within many different remote cloud-computing facilities. The cloud-aggregation management interface 2006 can display a wide variety of different types of information, including various types of status for remote VCC nodes and virtual data centers or other entities within which they reside. Management applications running within the remote clouds and accessed by the VCC nodes may allow the VCC server to provide detailed reporting, logging, and information displays with regard to fine-granularity usage of physical resources within remote clouds by the virtual data centers. In this fashion, the management interface may provide detailed reporting of physical cloud-computing facilities by each organization virtual data center within a remote cloud-computing facility that includes, or is managed by, a cloud director. In many ways, the VCC server and VCC nodes managed by the VCC server play a role, and create a level of abstraction, similar to the role played, and level of abstraction provided by, VDC management servers and cloud directors within physical data centers. The cloud-aggregation management interface 2006 may also allow an administrator to display and access individual management interfaces provided by cloud directors, VDC management servers, and third-party cloud-computing management entities within remote cloud-computing facilities. Thus, the VCC server and associated VCC nodes together provide the secure communications facilities and applications that allow an aggregation of virtual data centers and third-party cloud-computing facilities to be centrally managed through a single, high-level, cloud-aggregation management interface 2006.

Figure 21:
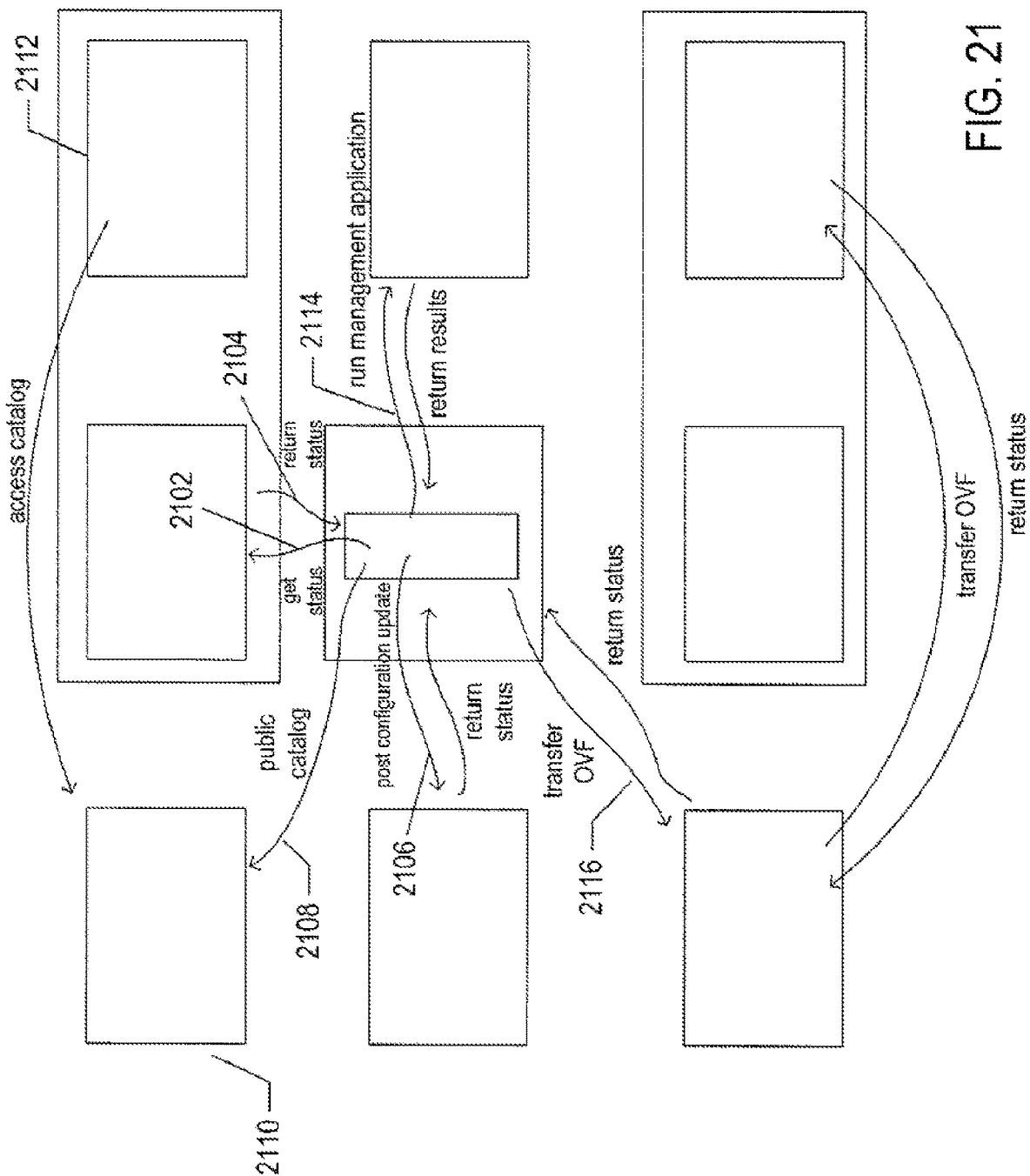
FIG. 21 illustrates a variety of different management operations carried out cooperatively by the VCC server and one or more VCC nodes.

FIG. 21 illustrates a variety of different management operations carried out cooperatively by the VCC server and one or more VCC nodes. These types of cooperative tasks are based on VCC node API calls, as discussed above with reference to FIGS. 13-19. One management operation is a get-status request issued by the VCC server to a particular VCC node. Depending on the VCC node's response, or lack thereof, the operational status of the VCC node, maintained by the VCC server and displayed in the cloud-aggregation management interface, may be altered from a previous status to a current status, such as from a "running" status to a "not responding" status in the case that the VCC node does not return a response to the get-status request. In that case, the VCC server may undertake additional steps to determine whether or not the VCC node and the remote virtual data center in which the VCC node resides continues to operate. When the VCC node and/or remote virtual data center is no longer operation, the VCC server may undertake steps to restart or reinstall and reconfigure the VCC node.

Another operation is carried out by the VCC server to periodically post configuration updates 2106 to remote VCC nodes. These configuration updates may include changes to configuration parameters specified by an administrator through the cloud-aggregation management interface, may include configuration-parameter changes resulting from automated VCC-server management and monitoring functionality, and/or may include new versions of the VCC-node virtual appliances to be installed and launched in place of, or in addition to, the currently executing VCC-node virtual appliances.

The VCC server may also direct a VCC node to publish a catalog 2108 of virtual appliances, operating-system executables, and virtual-appliance templates for access by other VCC nodes within remote clouds. For example, the VCC node in cloud 2110 may publish a catalog that can be accessed by the VCC node within the organization virtual data center 2112. Publishing of catalogs allows templates, virtual applications, and other information to be shared among clouds of the cloud aggregation.

The VCC server can direct a remote VCC node 2114 to run or interface to a management application within the remote cloud in which the VCC node resides on behalf of the VCC server. For example, the VCC server may direct remote VCC nodes to run or interface to an accounting and billing application to allow clients of the cloud aggregation to be billed for the physical computing resources within multiple remote clouds that they use over periods of time. Other types of management applications may also be accessed through VCC nodes by the VCC server. The VCC server, in response to directives input through the cloud-aggregation management interface, may also transfer 2116 virtual applications encoded within OVF files from one VCC node to another. Thus, virtual applications can be migrated among remote clouds by direct transfer operations in addition to publishing within catalogs.

Figure 22:
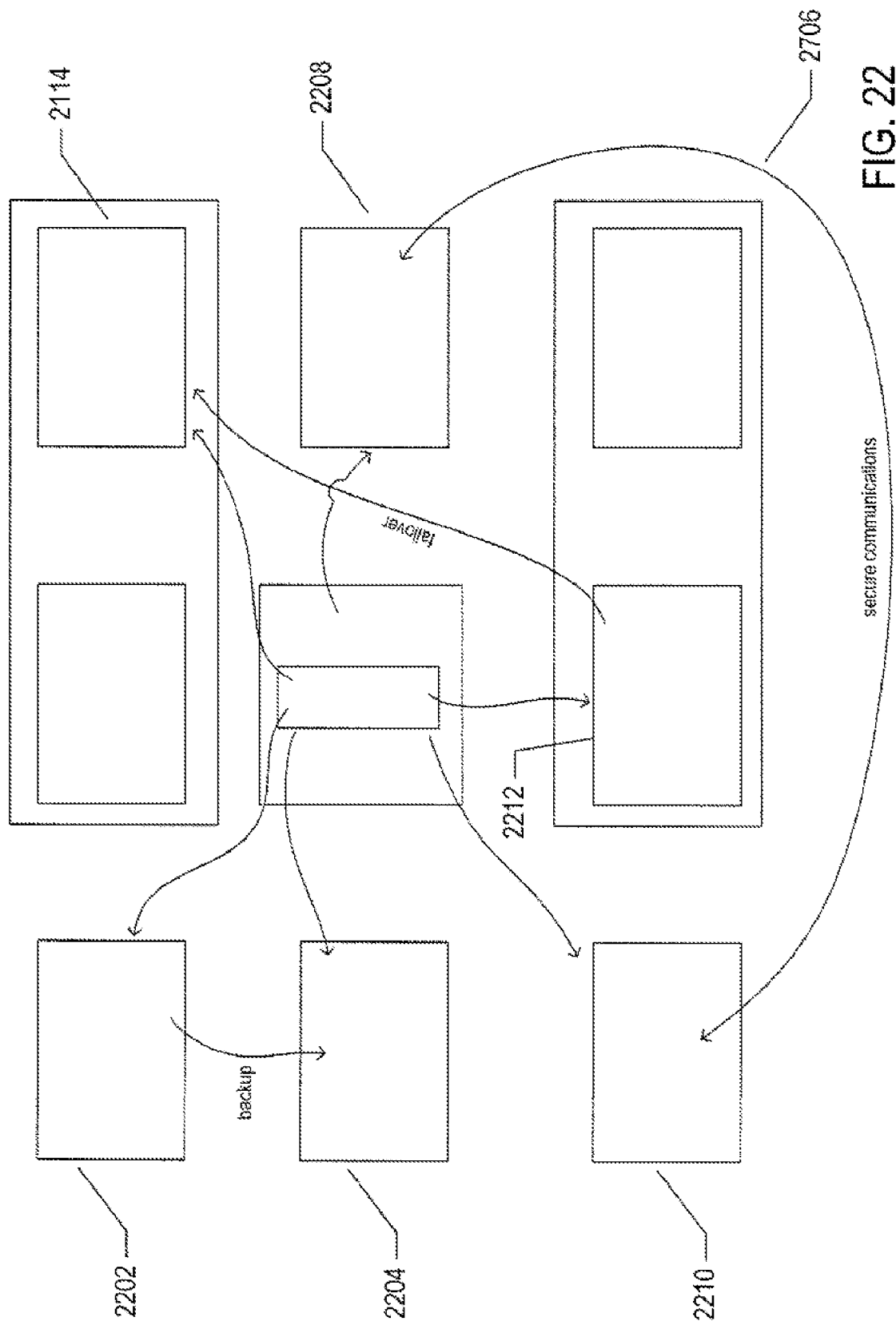
FIG. 22 illustrates a number of higher-level distributed operations carried out cooperatively by the VCC server and one or more VCC nodes.

Management of cloud aggregations by VCC-server-executed cloud-aggregation management tools can be further extended, based on the low-level operations discussed above with reference to FIGS. 13-19 and the higher-level operations discussed above with reference to FIGS. 20-21, to provide useful and powerful distributed operations between remote virtual data centers within different remote physical cloud-computing facilities. FIG. 22 illustrates a number of higher-level distributed operations carried out cooperatively by the VCC server and one or more VCC nodes. For example, the VCC server may provide a virtual-data-center backup facility to allow an entire virtual data center 2202, or components within the virtual data center, to be backed up to a second, different, remote virtual data center 2204. The VCC server may also arrange for high-bandwidth secure-communications links 2206 to be established between two different remote cloud-computing facilities 2208 and 2210. The VCC server may also arrange for a full or partial failover of one remote virtual data center 2212 to another 2214 in order to extend high-availability computing to the level of remote virtual data centers and remote cloud-computing facilities.

The VCC server and remote VCC nodes managed by the VCC server, along with cloud-aggregation management applications and various different management applications and management interfaces provided within remote cloud-computing facilities, together form a cloud aggregation that can be centrally managed through the cloud-aggregation management interface and that can employ cloud-computing facilities distributed across the face of the earth. Entire virtual data centers can be configured and launched from the cloud-aggregation management interface, and high-level distributed functionalities, such as virtual-data-center backup and high-availability of virtual-data-center-based computing can be implemented and managed through the level of abstraction created by the VCC server and remote VCC nodes managed by the VCC server.

While the VCC server and remote VCC nodes managed by the VCC server provide for collection and processing of detailed information regarding resource utilization within cloud-computing facilities at the granularity of tenant-associated VDCs, many currently available management tools and applications were developed without knowledge of tenant-associated VDCs provided by the cloud-director-based multi-tenant-VDC abstraction level. The current application is directed to methods and systems that allow tenant specific information to be provided to such applications, as well as for provision of global VDC information to be collected and provided to tenant-associated-VDC-aware applications that would otherwise be able to access only tenant-specific information.

Figure 23:
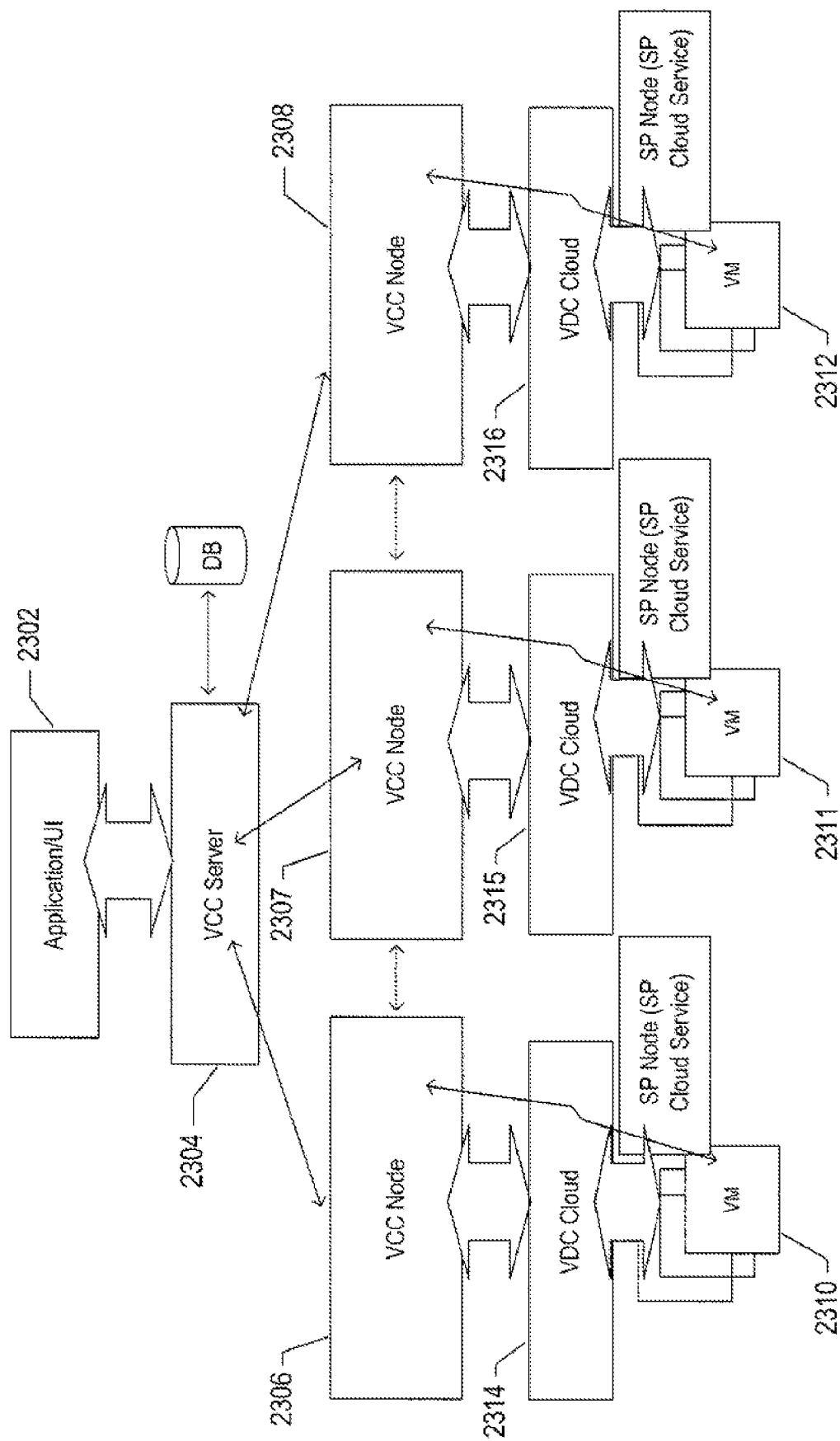
FIG. 23 illustrates one approach for providing tenant-specific information to applications unaware of tenant-associated VDCs provided by the cloud-director-based multi-tenant-VDC abstraction level.

FIG. 23 illustrates one approach for providing tenant-specific information to applications unaware of tenant-associated VDCs provided by the cloud-director-based multi-tenant-VDC abstraction level. In FIG. 23, an application/user-interface 2302 receives information collected by a VCC server 2304 and VCC nodes 2306 that cooperate with the VCC server. The VCC nodes 2306-2308 are each resident within VCD-based multitenant clouds managed by VCD. The application/user-interface 2302 may have been developed prior to the development of the cloud-director-based multi-tenant-VDC abstraction level. As a result, the application/user-interface is unable to receive and render tenant-associated-VDC usage information. However, a user of the application/user-interface may wish to receive tenant-specific information. The methods and systems to which the current application is directed provide an ability for tenant-specific information to be collected by the VCC server and supplied to the application/user-interface for rendering and display to a user seeking tenant-specific information.

Cloud providers and users of cloud-computing services may wish to employ many types of existing applications, from management applications to billing applications, that are unaware of the director-based multi-tenant-VDC abstraction level, and thus incapable of providing information and services based on tenant-associated VDCs. As one example of the methods and systems to which the current application is directed, and as shown in FIG. 23, cloud providers can deploy service-provider nodes ("SP nodes") within multi-tenant-VDCs that can interface to VCC nodes and, through VCC nodes, to the VCC server in order to furnish tenant-specific information back to the application/user-interface. The SP node in a multi-tenant VDC is aware of tenant-associated VDCs and can, as one example, filter information obtained by VCC nodes to extract tenant-specific information that can be returned to the application/user-interface. In other cases, the SP nodes, along with the VCC nodes and VCC server, can provide global information to the application/user-interface by modeling multi-tenant VDCs as a virtual single-tenant VDCs, and coalescing the virtual single-tenant VDCs for specific tenants into a single, cumulative single-tenant VDC. Many other types of information processing and presentation may be carried out by the SP nodes, VCC nodes, and VCC server to provide tenant-specific information to applications unaware of the cloud-director-based multi-tenant-VDC abstraction.

The SP node deployed in each of the VDC-based clouds has visibility across the cloud in which the SP node is deployed, and can therefore determine which tenants are assigned to, or using, the VMs in the cloud infrastructure. In other words, an SP node contains a mapping between tenant/organizations and VMs. The VCC node that is running on behalf of the tenant on the shared cloud infrastructure can provide information to the application about which VMs are in use for that tenant by accessing the mapping information maintained by the SP node. This way, even though an application has no visibility regarding the tenants running on a shared cloud infrastructure, the application can nonetheless be deployed to manage the shared cloud infrastructure and provide tenant specific information through the VCC application to the end user by extracting single tenant specific information from SP nodes and collecting tenant-specific data for the VMs that are in use by that tenant.

Returning to the cloud-aggregation management interface (2016 in FIG. 20), the implementation of information acquisition by the VCC server through remote VCC nodes in order to provide current status information for tenant-associated VDCs and remote cloud-computing facilities is next further considered. In the cloud-aggregation management-interface display shown in FIG. 20 (2006), status information and additional information are made available for access both for the entire remote clouds, such as remote cloud 2 (2009 in FIG. 20) as well as for the tenant-associated VDCs within the remote clouds, such as tenant-associated VDCs (2016 and 2017 in FIG. 20) within remote cloud 2009. However, as discussed above, VCC nodes are associated with each tenant-associated VDC. In certain cases, the VCC server may wish to obtain information related to a remote, cloud-director-managed cloud-computing facility at the cloud level, rather than information about a particular tenant-associated VDC. While this information may potentially be accessed by a VCC node associated with an tenant-associated VDC within the remote-cloud computing facility through an adapter to the cloud-director management interface, there may be security mechanisms, implementation techniques, and other factors that prevent or complicate extraction of cloud-level information through the cloud-director management interface a VCC node associated with an tenant-associated VDC within the cloud. A converse difficulty may arise when the VCC server accesses the services of a management application, executing within a remote cloud (2114 in FIG. 21), that is unaware of the cloud-director-based multi-tenant-VDC abstraction level, as discussed above. A management application may not have been implemented to take into consideration the fact that multiple tenant-associated VDCs may run within the context of a remote cloud-computing facility managed by a cloud director. In other words, the management application has been implemented either for general third-party cloud-computing facilities or for virtual data centers managed by a VDC management server. In this case, a VCC server may wish to obtain detailed management information with respect to the different tenant-associated VDCs running within a remote cloud-computing facility, but the management application may have no way to gather such organization-VDC-specific information.

Figure 24:
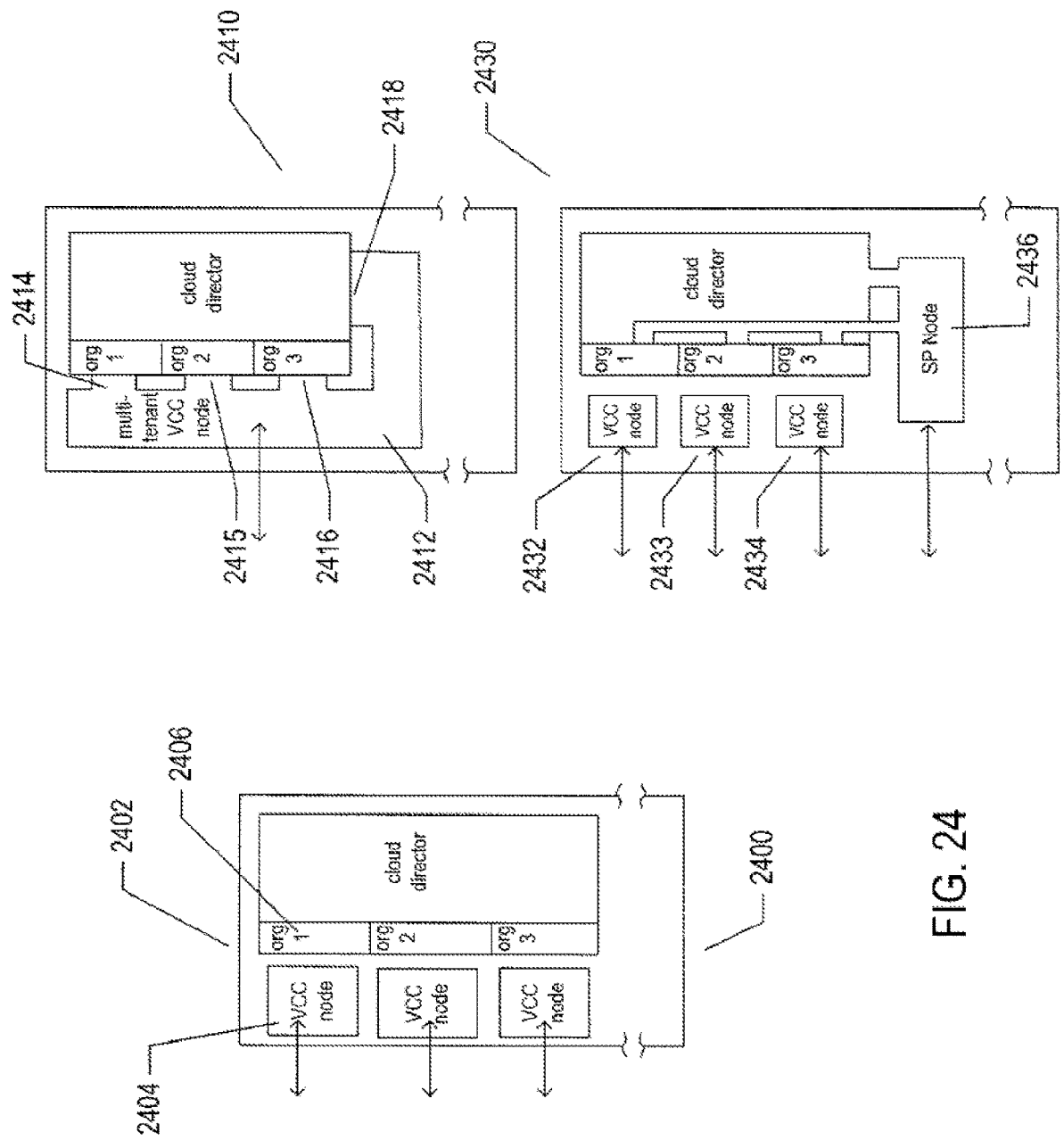
FIG. 24 illustrates alternative configurations of VCC-node-related functionality within remote cloud-director-managed cloud-computing facilities to enable VCC server access to both organization VDC information as well as cloud-computing-facility information.

FIG. 24 illustrates alternative configurations of VCC-node-related functionality within remote cloud-director-managed cloud-computing facilities to enable VCC server access to both tenant-associated VDC information as well as cloud-computing-facility information. In FIG. 24, the VCC-node configuration for a cloud-director-managed remote cloud-computing facility is shown as in FIG. 11. In this arrangement, a single VCC node, such as VCC node 2404, corresponds to each tenant-associated VDC, such as tenant-associated VDC 2406 associated with VCC node 2404. The VCC node is thus positioned, within the cloud-computing-facility hierarchy, to acquire information and carry out tasks related to a particular tenant-associated VDC. However, as pointed out above, management applications without knowledge of tenant-associated VDCs running within the remote cloud-computing facility may be unable to provide a VCC server with organization-VDC-level information and the higher-level cloud-computing facilities managed by the cloud director through a VCC-node associated with a single tenant-associated VDC within those facilities. FIG. 24 shows three different alternative implementations 2410, 2430, and 2450. In a first implementation 2410, rather than associating individual VCC nodes with individual tenant-associated VDCs, a single multi-tenant VCC node 2412 is installed and configured within the cloud-director server. The multi-tenant VCC node 2412 includes functionality to determine, and interface with, tenant-associated VDCs provided and managed by the cloud director. These interfaces are shown as interfaces 2414-2416 in FIG. 24. They may be VDC management interfaces to which VCC-node adapters interface, just as adapters 1218 and 1219 in FIG. 12 interface with a VDC management server interface 1224 and a cloud-director interface 1226. In addition, the multi-tenant VCC node interfaces directly to the cloud-director management interface 2418 and with cloud-resident virtual appliances and applications so that the multi-tenant VCC node can interface with management applications that are not implemented with organization-VDC-level knowledge.

In the alternative implementation 2430, the VCC nodes 2432-2434 are each associated with a particular tenant-associated VDC, as in the original implementation 2400. However, in alternative implementation 2430, an additional SP node 2436 is installed, configured, and registered by the service provider administrator. The SP node, a virtual appliance with an architecture like that of a VCC node, described above with reference to FIG. 12, is aware of both the organization-VDC level within the remote cloud-computing facility as well as the overall, higher-level cloud-computing facility managed by the cloud director. A SP node may execute, or be associated with, management applications without tenant-associated-VDC-level knowledge in order to provide tenant-associated-VDC-level results from the management application back to the VCC server. The SP node also provides web services that allow the VCC server to directly acquire higher-level remote-computing-facility information from the cloud director without the VCC server needing to obtain the information through a VCC node associated intimately with a particular tenant-associated VDC. The SP node, communicates with tenant specific VCC nodes within the cloud-computing facility. In other words, the SP node is a special node that provides tenant-specific mapping of VDC resources to virtual-infrastructure resources and that is queried by VCC node. Thus, through VCC node's interaction with SP node, the VCC server can access management applications and other applications unaware of the tenant-associated-VDC level as well as directly access cloud-computing-facility information through the cloud-director management interface pertaining to the cloud-computing facility at a level above that of individual tenant-associated VDCs.

By either providing a multi-tenant VCC node that includes SP-node functionality or by providing a separate SP node within cloud-director servers, the current application discloses a method for extending VCC-server communications to a cloud level as well as to the tenant-associated VDC level for those remote cloud-computing facilities managed by a cloud director. The SP node or multi-tenant VCC nodes provide finer-granularity mapping of functionality to cloud-director-managed entities.

Although the present invention has been described in terms of particular embodiments, it is not intended that the invention be limited to these embodiments. Modifications within the spirit of the invention will be apparent to those skilled in the art. For example, VCC-server and VCC-node functionality may be implemented in virtual appliances using many different programming languages, modular organizations, control structures, data structures, and by varying other such implementation parameters. VCC nodes may be implemented to adapt to, and interface to, a variety of different types of other virtual appliances and functionalities within the cloud-computing facility in which the VCC node resides. The ability of the VCC server to access web services in remote cloud-computing facilities through VCC nodes provides the ability for the VCC server to access any number of different types of functionalities through various different API-call interfaces provided by a variety of different types of web services. Although the current application has mentioned a number of specific examples, many additional examples can be implemented and configured to extend the functionality of the VCC server and cloud-aggregation management applications and interfaces provided by the VCC server.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A cloud-computing-facility aggregation and application-support subsystem within a multiple cloud-computing-facility aggregation that includes multiple, operationally distinct cloud-computing facilities, the cloud-computing-facility aggregation and application-support subsystem comprising:
a cloud-connector server that runs within a context of a private cloud and provides an electronic cloud-aggregation management interface for the private cloud and the multiple, operationally distinct remote cloud-computing facilities; and
multiple cloud-connector nodes, each single cloud-connector node installed in a virtual data center management server, cloud director, or management system within each cloud-computing facility of the multiple cloud-computing-facility aggregation, each cloud-connector node providing an electronic interface through which the cloud-connector server accesses services provided by the cloud-connector node and that each accesses a cloud-management interface within the cloud-computing facility in which the cloud-connector node is installed through which the cloud-connector node accesses local cloud-management services on behalf of the cloud-connector server.

2. The cloud-computing-facility aggregation and application-support subsystem of claim 1, wherein a first portion of the remote cloud-computing facilities are managed by the cloud director and a second portion of the cloud-computing facilities are managed by the virtual data center management director.

3. The cloud-computing-facility aggregation and application-support subsystem of claim 1, further comprising multiple service-provider nodes, each service-provider node installed in the virtual data center management server, the cloud director, or management system within each remote cloud-computing facility of the multiple remote cloud-computing-facilities.

4. The cloud-computing-facility aggregation and application-support subsystem of claim 3, wherein each service-provider node accessing a cloud-director management interface to obtain information related to tenant-associated virtual data centers provided by the cloud-director and information related to multi-tenant virtual data center from which the tenant-associated virtual data centers are provided and transmit the obtained information through an electronic interface to the cloud-connector node.

5. The cloud-computing-facility aggregation and application-support subsystem of claim 1, wherein the virtual cloud-connector interface further enables the user to configure the respective cloud-connector node as a public cloud-connector node or a private cloud-connector node.

6. The cloud-computing-facility aggregation and application-support subsystem of claim 5, wherein when the respective cloud connector node is a public cloud connector node, the user sets a public attribute to characterize the respective cloud connector node to the cloud connector server through the electronic administrative interface.

7. The cloud-computing-facility aggregation and application-support subsystem of claim 5, wherein when the respective cloud connector node is a private cloud connector node, the user sets a private attribute to characterize the respective cloud connector node to the cloud connector server through the electronic administrative interface.

8. The cloud-computing-facility aggregation and application-support subsystem of claim 5, wherein the respective cloud-connector node is configured as a public cloud-connector node when the cloud-connector node is installed in a public cloud with secure HTTP.

9. The cloud-computing-facility aggregation and application-support subsystem of claim 1, wherein the cloud-connector server is configured to periodically post configuration updates to the multiple cloud-connector nodes.

10. The cloud-computing-facility aggregation and application-support subsystem of claim 8, wherein the administrative interface further enables the user to input an identification of an HTTP proxy server and port through which the respective cloud-connector node receives cloud-connector node application-program-interface (API) calls from the cloud-connecter server and from other cloud-connector nodes, and wherein the administrative interface further enables the user to enter the IP address of the proxy server through which the respective cloud-connector node receives API calls and the HTTP port through which the respective cloud-connector node receives API calls.

11. A method comprising:
providing a cloud-connector server that runs within a context of a private cloud and provides an electronic cloud-aggregation management interface for the private cloud and multiple, operationally distinct remote cloud-computing facilities; and
installing a cloud connector node in a virtual data center management server, cloud director, or management system within a cloud-computing facility of a multiple cloud-computing-facility aggregation, the cloud-connector node comprising a virtual cloud-connector interface through which the cloud-connector server accesses services provided by the cloud-connector node and that each accesses a cloud-management interface within the cloud-computing facility in which the cloud-connector node is installed through which the cloud-connector node accesses local cloud-management services on behalf of the cloud-connector server.

12. The method of claim 11, further comprising:
registering the cloud-connector node with a cloud-connector server that connects and manages the cloud-connector node by:
logging into the cloud connecter node using the virtual cloud-connector interface; and
providing an IP address of the cloud-connector server.

13. The method of claim 11, further comprising configuring, using the virtual cloud-connector interface, the cloud-connector node as a public cloud-connector node or a private cloud-connector node.

14. The method of claim 13, wherein when the respective cloud connector node is a public cloud connector node, setting a public attribute to characterize the cloud connector node to the cloud connector.

15. The method of claim 13, wherein when the respective cloud connector node is a private cloud connector node, setting a private attribute to characterize the cloud connector node to the cloud connector server.

16. The method of claim 13, wherein the cloud-connector node is configured as a public cloud-connector node when the cloud-connector node is installed in a public cloud with secure HTTP.

17. The method of claim 11, further comprising providing an identification of an HTTP proxy server and port through which the cloud-connector node receives cloud-connector node application-program-interface (API) calls from the cloud-connecter server and from other cloud-connector nodes.

18. The method of claim 17, further comprising providing, to the cloud-connector server, the IP address of the proxy server through which the respective cloud-connector node receives API calls and the HTTP port through which the respective cloud-connector node receives API calls.

19. A non-transitory computer-readable storage media comprising computer-executable instructions that, when executed by a processor, cause the processor to perform operations comprising:
providing a cloud-connector server that runs within a context of a private cloud and provides an electronic cloud-aggregation management interface for the private cloud and multiple, operationally distinct remote cloud-computing facilities; and
installing a cloud connector node in a virtual data center management server, cloud director, or management system within a cloud-computing facility of a multiple cloud-computing-facility aggregation, the cloud-connector node comprising a virtual cloud-connector interface through which the cloud-connector server accesses services provided by the cloud-connector node and that each accesses a cloud-management interface within the cloud-computing facility in which the cloud-connector node is installed through which the cloud-connector node accesses local cloud-management services on behalf of the cloud-connector server.

20. The non-transitory computer-readable media of claim 19, wherein the computer-executable instructions further cause the processor to configure the cloud-connector node as a public cloud-connector node or a private cloud-connector node.

* * * * *